(12) United States Patent
Kato et al.

(10) Patent No.: US 6,774,924 B2
(45) Date of Patent: Aug. 10, 2004

(54) SCANNING OPTICAL DEVICE WITH SINGLE LENS SCANNING OPTICAL ELEMENT

(75) Inventors: Manabu Kato, Utsunomiya (JP); Hiroshi Sato, Utsunomiya (JP); Hidekazu Shimomura, Yokohama (JP); Keiichiro Ishihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/224,650

(22) Filed: Aug. 21, 2002

(65) Prior Publication Data

US 2003/0048352 A1 Mar. 13, 2003

(30) Foreign Application Priority Data

Aug. 24, 2001 (JP) ........................................ 2001-254251

(51) Int. Cl.$^7$ ................................................ B41J 27/00
(52) U.S. Cl. ........................................ 347/244; 347/258
(58) Field of Search ................................ 347/241, 244, 347/256, 258, 137, 259; 359/648, 662, 207

(56) References Cited

U.S. PATENT DOCUMENTS

| | | | |
|---|---|---|---|
| 5,111,219 A | 5/1992 | Makino | 347/259 |
| 5,257,047 A | * 10/1993 | Haneda et al. | 347/137 |
| 5,557,446 A | 9/1996 | Kato | 359/206 |
| 5,883,732 A | * 3/1999 | Takada et al. | 359/207 |
| 5,966,161 A | 10/1999 | Kato | 347/258 |
| 5,995,131 A | 11/1999 | Fujibayashi et al. | 347/258 |
| 6,046,835 A | 4/2000 | Yamawaki et al. | 359/205 |
| 6,094,286 A | 7/2000 | Kato | 359/206 |
| 6,133,935 A | 10/2000 | Fujibayashi et al. | 347/258 |
| 6,154,245 A | 11/2000 | Kato | 347/244 |
| 6,185,029 B1 | 2/2001 | Ishihara | 359/216 |
| 6,424,446 B2 | 7/2002 | Toyoda et al. | 359/205 |
| 6,448,998 B1 | * 9/2002 | Suzuki et al. | 347/258 |
| 6,542,278 B2 | 4/2003 | Kato | 359/205 |
| 6,683,707 B2 | 1/2004 | Ishihara et al. | 359/205 |
| 2002/0149668 A1 | 10/2002 | Kato | 347/244 |
| 2003/0025784 A1 | 2/2003 | Sato et al. | 347/244 |
| 2003/0053185 A1 | 3/2003 | Shimomura et al. | 359/197 |

FOREIGN PATENT DOCUMENTS

| | | |
|---|---|---|
| JP | 4-50908 | 2/1992 |
| JP | 9-33850 | 2/1997 |

* cited by examiner

*Primary Examiner*—Hai Pham
(74) *Attorney, Agent, or Firm*—Fitzpatrick, Cella, Harper & Scinto

(57) ABSTRACT

Disclosed is a scanning optical device and an image forming apparatus using the same, wherein the scanning optical device includes a scanning optical element provided by a single lens. In relation to a predetermined one of two optical surfaces of the single lens having a larger refractive power in a minor scan direction on an optical axis, the shape of optical surface of the single lens is determined so as to satisfy a relation $$0.9 \leq \phi m/\phi p \leq \phi mx/\phi px = 1.0 \leq 1.1 \phi m/\phi p$$

where $\phi p$ is a refractive power of the single lens in a minor scan direction on the optical axis, $\phi m$ is a refractive power of the single lens in the minor scan direction at a most abaxial point, $\phi px$ is a refractive power at the predetermined optical surface of the single lens in the minor scan direction on the optical axis, and $\phi mx$ is a refractive power at the predetermined optical surface of the single lens in the minor scan direction at a most abaxial point.

37 Claims, 21 Drawing Sheets

DESIGN DATA

| | | | TORIC LENS SURFACE SHAPE (MAJOR SCAN) | | TORIC LENS SURFACE SHAPE (MINOR SCAN) | | |
|---|---|---|---|---|---|---|---|
| | | | 1ST SURFACE | 2ND SURFACE | | 1ST SURFACE | 2ND SURFACE |
| WAVELENGTH, REFRACTIVITY | | | | | r | ∞ | -2.35613E+01 |
| USED WAVELENGTH | λ (nm) | 780 | R | 4.27400E+02 | -9.47135E+01 | | |
| TORIC LENS REFRACTIVITY | nd | 1.53064 | K | 3.71366E+00 | 0.00000E+00 | D2s | 0.00000E+00 | 6.33197E-05 |
| ABBE NUMBER | γd | 55.5 | B4 | -1.85091E-07 | 0.00000E+00 | D4s | 0.00000E+00 | 2.50292E-09 |
| LIGHT RAY ANGLE | | | B6 | 3.44576E-11 | 0.00000E+00 | D6s | 0.00000E+00 | -3.34091E-13 |
| INCIDENCE ANGLE OF POLYGONAL | θp | 90.0 | B8 | -6.82420E-15 | 0.00000E+00 | D8s | 0.00000E+00 | 1.43974E-16 |
| MAX.EMISSION ANGLE OF POLYGONAL | θe | 40.9 | B10 | 7.10650E-19 | 0.00000E+00 | D10s | 0.00000E+00 | 0.00000E+00 |
| DISPOSITION | | | | | | D2e | 0.00000E+00 | 6.33197E-05 |
| POLYGONAL SURFACE-TORIC LENS 1ST SURFACE | e1 | 51.45 | | | | D4e | 0.00000E+00 | 2.50292E-09 |
| TORIC LENS CENTER THICKNESS | d1 | 17.90 | | | | D6e | 0.00000E+00 | -3.34091E-13 |
| TORIC LENS 2ND SURFACE-SCANNED SURFACE | e2 | 147.28 | | | | D8e | 0.00000E+00 | 1.43974E-16 |
| EFFECTIVE SCAN WIDTH ON SCANNED SURFACE | W | 214.00 | | | | D10e | 0.00000E+00 | 0.00000E+00 |
| OTHERS | | | SUBSCRIPT "s": LASER SIDE | | | | | |
| | | | SUBSCRIPT "e": OPPOSITE TO LASER SIDE | | | | | |
| MAJOR SCAN FOCAL LENGTH OF TORIC LENS | fm | 149.67 | | | | | | |
| POLYGONAL SURFACE=SCANNED SURFACE | L | 216.63 | | | | | | |
| L/fm | a | 1.45 | | | | MINOR SCAN POWER RATIO | | |
| PRINCIPAL PLANE INTERVAL | HH' | 11.88 | | | | | $\phi s2/\phi s$ | 1,000 |
| (L−HH')/fm | b | 1.37 | | | | | | |

FIG. 4

DESIGN DATA

| | | | TORIC LENS SURFACE SHAPE (MAJOR SCAN) | | TORIC LENS SURFACE SHAPE (MINOR SCAN) | |
|---|---|---|---|---|---|---|
| | | | 1ST SURFACE | 2ND SURFACE | 1ST SURFACE | 2ND SURFACE |
| WAVELENGTH, REFRACTIVITY | | | | | | |
| USED WAVELENGTH | $\lambda$ (nm) | | 780 | | | |
| TORIC LENS REFRACTIVITY | nd | | 1.53064 | | | |
| ABBE NUMBER | $\gamma$d | | 55.5 | | | |
| | | R | 2.42364E+02 | -1.14019E+02 | r | -2.07641E+01 |
| | | K | -4.82223E+01 | 4.38342E+00 | D2s | 1.82916E-04 |
| | | B4 | -5.14599E-07 | | D4s | -2.34850E-08 |
| | | B6 | 2.81558E-11 | | D6s | -1.50404E-11 |
| | | B8 | -1.53776E-14 | | D8s | 2.47392E-14 |
| | | B10 | -8.81445E-18 | | D10s | -7.50000E-18 |
| | | | SUBSCRIPT "s": LASER SIDE | | D2e | 1.51171E-04 |
| | | | SUBSCRIPT "e": OPPOSITE TO LASER SIDE | | D4e | 2.80324E-08 |
| | | | | | D6e | -2.07820E-11 |
| | | | | | D8e | -4.61796E-15 |
| | | | | | D10e | 5.69401E-18 |
| LIGHT RAY ANGLE | | | | | | |
| INCIDENCE ANGLE OF POLYGONAL | $\theta$p | | -90.0 | | | |
| MAX.EMISSION ANGLE OF POLYGONAL | $\theta$e | | 42.0 | | | |
| DISPOSITION | | | | | | |
| POLYGONAL SURFACE-TORIC LENS | e1 | | 39.4 | | | |
| TORIC LENS CENTER THICKNESS | d1 | | 14.0 | | | |
| TORIC LENS-SCANNED SURFACE | e2 | | 146.4 | | | |
| OTHERS | | | | | | |
| MAJOR SCAN FOCAL LENGTH OF TORIC LENS | fm | | 149.9 | | | |
| POLYGONAL SURFACE-SCANNED SURFACE | L | | 199.8 | | | |
| | a | | 13.3 | | | |
| | L/fm | | | | MINOR SCAN POWER RATIO | |
| | | | | | $\phi s2/\phi s$ | 0.932 |

FIG. 10

DESIGN DATA

| WAVELENGTH, REFRACTIVITY | | | TORIC LENS SURFACE SHAPE (MAJOR SCAN) | | | TORIC LENS SURFACE SHAPE (MINOR SCAN) | | |
|---|---|---|---|---|---|---|---|---|
| | | | | 1ST SURFACE | 2ND SURFACE | | 1ST SURFACE | 2ND SURFACE |
| USED WAVELENGTH | λ (nm) | 780 | R | 4.27400E+02 | -9.47135E+01 | r | 2.50000E+02 | -2.51836E+01 |
| TORIC LENS REFRACTIVITY | nd | 1.53064 | K | 3.71366E+00 | 0.00000E+00 | D2s | 0.00000E+00 | 8.57437E-05 |
| τ · ABBE NUMBER | γd | 55.5 | B4 | -1.85091E-07 | 0.00000E+00 | D4s | 0.00000E+00 | 6.32619E-09 |
| LIGHT RAY ANGLE | | | B6 | 3.44576E-11 | 0.00000E+00 | D6s | 0.00000E+00 | 7.63855E-13 |
| INCIDENCE ANGLE OF POLYGONAL | θp | 90.0 | B8 | -6.82420E-15 | 0.00000E+00 | D8s | 0.00000E+00 | 1.67725E-18 |
| MAX. EMISSION ANGLE OF POLYGONAL | θe | 40.9 | B10 | 7.10650E-19 | 0.00000E+00 | D10s | 0.00000E+00 | 0.00000E+00 |
| DISPOSITION | | | | | | D2e | 0.00000E+00 | 8.57437E-05 |
| POLYGONAL SURFACE-TORIC LENS 1ST SURFACE | e1 | 51.45 | | | | D4e | 0.00000E+00 | 6.32619E-09 |
| TORIC LENS CENTER THICKNESS | d1 | 17.90 | | | | D6e | 0.00000E+00 | 7.63855E-13 |
| TORIC LENS 2ND SURFACE-SCANNED SURFACE | e2 | 147.28 | | | | D8e | 0.00000E+00 | 1.67725E-18 |
| EFFECTIVE SCAN WIDTH ON SCANNED SURFACE | W | 214.00 | | | | D10e | 0.00000E+00 | 0.00000E+00 |
| OTHERS | | | SUBSCRIPT "s": LASER SIDE | | | | | |
| MAJOR SCAN FOCAL LENGTH OF TORIC LENS | fm | 149.67 | SUBSCRIPT "e": OPPOSITE TO LASER SIDE | | | | | |
| POLYGONAL SURFACE=SCANNED SURFACE | L | 216.63 | | | | | | |
| L/fm | a | 1.45 | | | | | | |
| | HH' | 11.88 | | | | MINOR SCAN POWER RATIO | | |
| PRINCIPAL PLANE INTERVAL | | | | | | | | |
| (L-HH')/fm | b | 1.37 | | | | $\phi s2/\phi s$ | | 0.929 |

FIG. 15

DESIGN DATA

| WAVELENGTH, REFRACTIVITY | | | TORIC LENS SURFACE SHAPE (MAJOR SCAN) | | | TORIC LENS SURFACE SHAPE (MINOR SCAN) | | |
|---|---|---|---|---|---|---|---|---|
| | | | | 1ST SURFACE | 2ND SURFACE | | 1ST SURFACE | 2ND SURFACE |
| USED WAVELENGTH | $\lambda$ (nm) | 780 | R | 5.40906E+02 | -9.06497E+01 | r | $\infty$ | -2.45730E+01 |
| TORIC LENS REFRACTIVITY | nd | 1.53064 | K | 0.00000E+00 | 9.20642E-02 | D2s | 0.00000E+00 | 5.32882E-05 |
| ABBE NUMBER | $\nu$d | 55.5 | | | | D4s | 0.00000E+00 | 7.77680E-09 |
| LIGHT RAY ANGLE | | | B4 | 0.00000E+00 | 1.07113E-07 | D6s | 0.00000E+00 | -5.07920E-12 |
| INCIDENCE ANGLE OF POLYGONAL | $\theta$p | 90.0 | B6 | 0.00000E+00 | 2.41567E-11 | D8s | 0.00000E+00 | 2.03433E-15 |
| MAX.EMISSION ANGLE OF POLYGONAL | $\theta$e | 40.9 | B8 | 0.00000E+00 | -2.82729E-16 | D10s | 0.00000E+00 | -2.94443E-19 |
| DISPOSITION | | | B10 | 0.00000E+00 | 2.21417E-19 | D2e | 0.00000E+00 | 5.32882E-05 |
| POLYGONAL SURFACE-TORIC LENS 1ST SURFACE | e1 | 54.35 | | | | D4e | 0.00000E+00 | 7.77680E-09 |
| TORIC LENS CENTER THICKNESS | d1 | 19.72 | | | | D6e | 0.00000E+00 | -5.07920E-12 |
| TORIC LENS 2ND SURFACE-SCANNED SURFACE | e2 | 147.18 | | | | D8e | 0.00000E+00 | 2.03433E-15 |
| EFFECTIVE SCAN WIDTH ON SCANNED SURFACE | W | 214.00 | | | | D10e | 0.00000E+00 | -2.94443E-19 |
| OTHERS | | | SUBSCRIPT "s": LASER SIDE | | | | | |
| MAJOR SCAN FOCAL LENGTH OF TORIC LENS | fm | 149.72 | SUBSCRIPT "e": OPPOSITE TO LASER SIDE | | | | | |
| POLYGONAL SURFACE=SCANNED SURFACE | L | 221.25 | | | | | | |
| L/fm | a | 1.48 | | | | MINOR SCAN POWER RATIO | | |
| PRINCIPAL PLANE INTERVAL | HH' | 13.08 | | | | $\phi$s2/$\phi$s | | 1.000 |
| (L−HH')/fm | b | 1.39 | | | | | | |

FIG. 23

| | PRINCIPAL | | | | MARG | | | |
|---|---|---|---|---|---|---|---|---|
| | X | Y | D | D/N | X | Y | D | D/N |
| POLYGONAL SURFACE | 0.000 | -0.672 | | | 0.000 | 0.000 | | |
| FACE R1 | 54.354 | -0.672 | 54.354 | 54.354 | 56.574 | 48.956 | 74.815 | 74.815 |
| FACE R2 | 74.069 | -0.663 | 19.714 | 12.934 | 59.772 | 50.313 | 3.474 | 2.279 |
| IMAGE PLANE | 221.255 | -0.003 | 147.187 | 147.187 | 221.255 | 106.854 | 171.095 | 171.095 |

La0    67.288    La$\theta$    77.094
Lb0    147.187    Lb$\theta$    171.095

La$\theta$/La$\theta$ * La0/La0    1.0145767

FIG. 24

SCANNING OPTICAL DEVICE WITH SINGLE LENS SCANNING OPTICAL ELEMENT

FIELD OF THE INVENTION AND RELATED ART

This invention relates to a scanning optical device and, more particularly, a scanning optical device in which a light beam emitted from light source means is deflected by a deflecting element and, with the deflected light beam and through an imaging element having fθ characteristic, a surface to be scanned is optically scanned, whereby imagewise information is recorded thereon. The scanning optical device of the present invention is particularly suitably usable in an image forming apparatus such as a laser beam printer having an electrophotographic process, a digital copying machine, or a multifunction printer, for example.

Conventionally, in scanning optical devices for a laser beam printer (LBP), for example, a light beam emitted from light source means is modulated in accordance with an imagewise signal. The modulated light beam is periodically deflected by means of an optical deflector which may comprise a polygonal mirror, for example. Then the deflected light is converged by an imaging optical system having fθ characteristic, into a light spot on the surface of a recording medium having photosensitivity, to optically scan the same, whereby image recording is accomplished.

FIG. 18 is a schematic view of a conventional scanning optical device. In FIG. 18, a divergent light beam emitted from light source means 1 is transformed by a collimator lens 2 into substantially parallel light. After being restricted by a stop 3, the light beam enters a cylindrical lens 4. As regards the parallel light beam entered into the cylindrical lens 4, with respect to a major (primary) scan plane, the light is directly emitted as it is, whereas, with respect to a minor (secondary) scan plane, the light is converged. As a result, the light is imaged on a reflection surface of a light deflector (polygonal mirror) 5, as approximately a linear image. The light beam reflectively deflected by the reflection surface of the light deflector 5 is directed through a scanning optical element (fθ lens) having fθ characteristic to a surface 8 to be scanned. By rotating the light deflector 5 in a direction of an arrow, the surface 8 is scanned with light.

In such scanning optical device, for high-precision recording of imagewise information, there are requirements to be satisfied, as follows.

1) Curvature of field should be well corrected over the whole surface to be scanned.
2) Distortion characteristic (fθ characteristic) with velocity uniformness should be maintained between the scan angle θ and the image height Y.
3) Spot diameter on the image plane should be uniform, with respect to different image heights.

Many proposals have been made to provide a scanning optical device satisfying these optical characteristics or a correction optical system (scanning optical element) therefor.

On the other hand, there are similar requirements in relation to scanning optical devices, to meet reduction in size and cost of laser beam printers or digital copying machines. As an example of a structure satisfying such requirements, Japanese Laid-Open Patent Application, Laid-Open Nos. 4-50908 and 9-33850 propose a scanning optical system in which a scanning optical element is constituted by a single element.

In Japanese Laid-Open Patent Application, Laid-Open No. 4-50908, a high-order aspherical surface is used in a scanning optical element with respect to a major (primary) scan direction, to correct aberration characteristics relatively well. However, since the magnification between a light deflector and the surface to be scanned, with respect to the minor (secondary) scan direction, is not constant, the spot diameter in the minor scan direction may change with the image height.

On the other hand, Japanese Laid-Open Patent Application, Laid-Open No. 9-33850 shows a scanning optical device having a scanning optical element which is arranged so that, in at least two of the lens surfaces thereof, the curvature in the minor scan direction changes continuously within an effective portion of an imaging lens and in the major scan direction, independently from the curvature in the major scan direction. Thus, the position of a principal plane in the minor scan direction is controlled by bending two surfaces, to make constant the minor scan magnification at different image heights, thereby to make the spot diameter constant.

In this proposal, however, in order to make the minor scan magnification constant, at least two surfaces are bent so as to control the position of the principal plane to make the magnification constant. Thus, the shape in major direction and the shape in minor direction are determined completely independently of each other. Therefore, in order to keep the lens thickness small, in many cases, the lens shape in the major scan direction contains a relatively large aspherical amount.

With a lens having a large aspherical amount in the major scan direction, as described above, optical performance would be much degraded by an error of disposition of each lens surface and of the lens itself. As regards degradation of optical performance, particularly the curvature of scan line in minor scan direction leads to a serious problem because it can not be corrected by adjustment of a mirror or the like, disposed in the major assembly of the device, as contrasted to deviation of scan line height or scan line tilt. In consideration of it, in order to minimize the scan line curvature, each lens surface and the lens itself must be disposed very precisely, exactly in accordance with design values. Alternatively, an adjusting mechanism has to be added for the lens, to adjust the disposition exactly as designed.

As regards color image forming apparatuses in which four photosensitive members (photosensitive drums) each being provided with an optical scanning device are used and, while a latent image is produced by use of laser light, images of four colors of Y (yellow), M (magenta), C (cyan) and Bk (black) are formed on surfaces of corresponding photosensitive members, respectively, the images of four colors Y, M, C and Bk thus formed on the respective photosensitive members should be superposed one upon another on a transfer material such as a paper sheet. If, therefore, the scan lines of the scanning devices corresponding to the four photosensitive members, respectively, have a curvature, an error would be produced in the scan line shape of the four colors which would cause color misregistration in images formed on the transfer material. This results in considerable degradation of the image performance.

FIG. 19 illustrates a shift amount of scan line on the surface to be scanned, where, in the structure of an embodiment shown in the aforementioned Japanese patent application, a scanning optical element and optical surfaces thereof are deviated by 50 microns in a direction (minor scan direction) perpendicular to the major scan direction. It is seen from the drawing that a large scan line curvature is produced by deviation of an optical surface and that, in order to obtain a high-quality image, the disposition precision must be improved and deviation adjustment is required.

In FIG. 19, a curve R1 depicts the amount of scan line curvature where only a light entrance surface of a fθ lens 6 is deviated in the minor scan direction. Curve R2 depicts the amount of scan line curvature where only a light exit surface of the fθ lens 6 is deviated. A block curve depicts the amount of scan line curvature where both the light entrance surface and the light exit surface of the fθ lens 6 are deviated.

SUMMARY OF THE INVENTION

It is a first object of the present invention to provide a scanning optical device and an image forming apparatus using the same, by which, in a molded lens, even if there is produced a deviation of a light exit surface in Z direction (minor scan direction), with respect to a light entrance surface, due to insufficient precision of molding or the like, since the minor scan magnification at each surface of a scanning lens can be held substantially constant, a curvature of scan line at the surface to be scanned due to the deviation in the minor scan direction, can be avoided.

It is a second object of the present invention to provide a scanning optical device and an image forming apparatus using the same, by which field-curvature characteristic, fθ characteristic for constant-speed scan, and wavefront aberration which are characteristics of an optical system are additionally well corrected, and by which, through appropriate shape setting to a scanning optical element, a curvature of scan line due to an error in disposition of a molded lens can be minimized.

These and other objects, features and advantages of the present invention will become more apparent upon a consideration of the following description of the preferred embodiments of the present invention taken in conjunction with the accompanying drawings.

BREIF DESCRIPTION OF THE DRAWINGS

FIG. 4 illustrates design data in the first embodiment.

FIG. 10 illustrates design data in the second embodiment.

FIG. 15 illustrates design data in the third embodiment.

FIG. 23 illustrates design data in the fourth embodiment.

FIG. 24 illustrates coordinates of light rays as well as ray distance, in the fourth embodiment.

DESCRIPTION OF THE PREFERRED EMBODIMENTS

Preferred embodiments of the present invention will now be described with reference to the attached drawings.

[First Embodiment]

Figure 1:
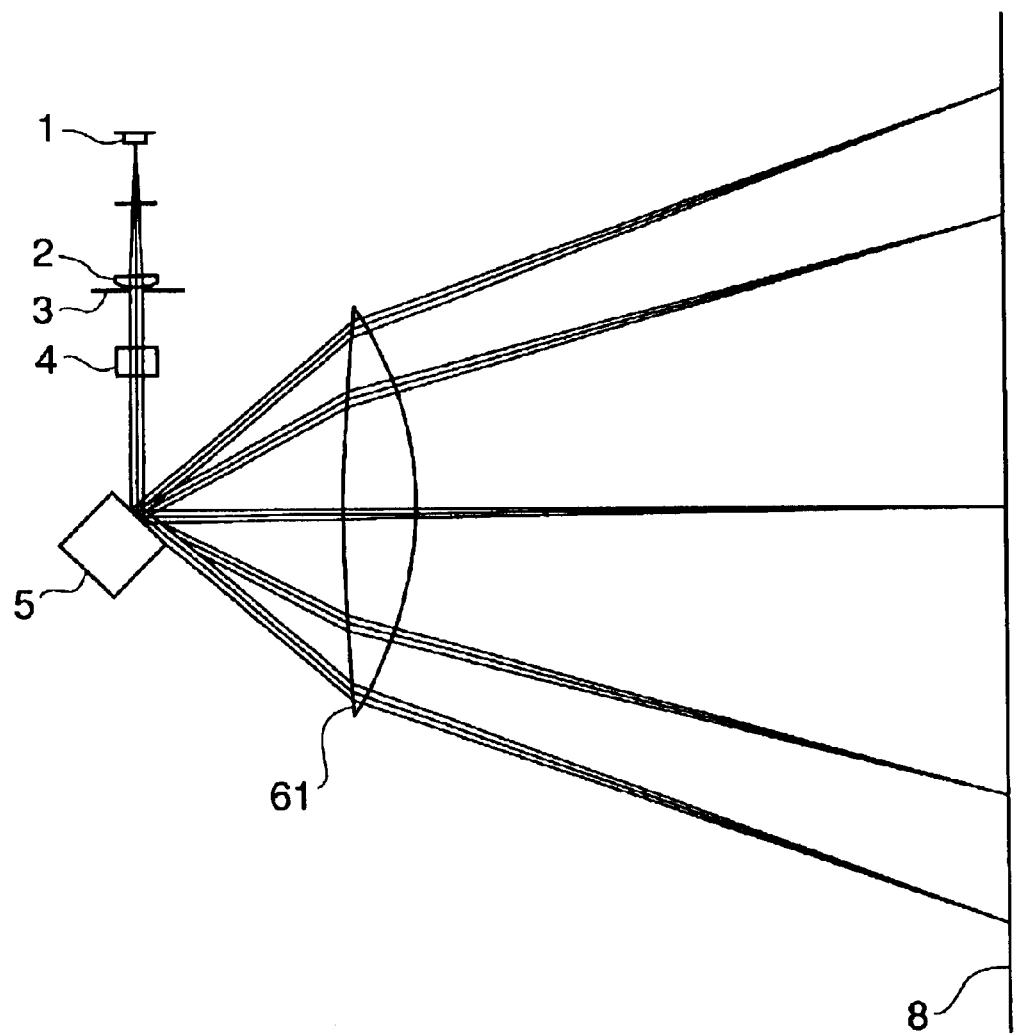
FIG. 1 is a sectional view of a scanning optical device according to a first embodiment of the present invention, in a major scan direction.
Figure 2:
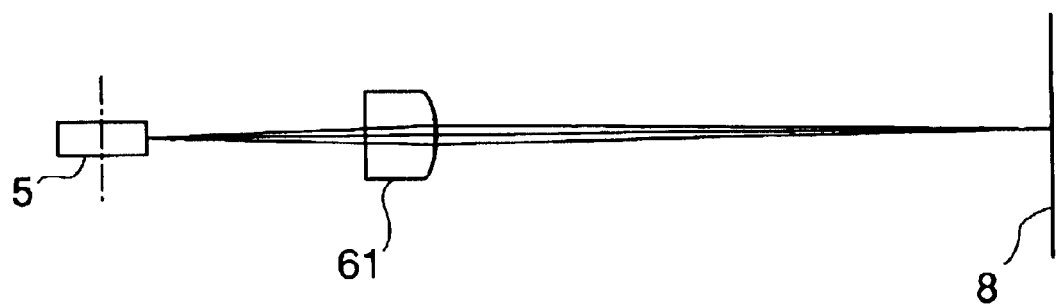
FIG. 2 is a sectional view of a scanning optical device according to the first embodiment of the present invention, in a minor scan direction.

FIG. 1 is a sectional view of a scanning optical device according to a first embodiment of the present invention, in a major scan direction. FIG. 2 is a sectional view in a minor scan direction.

This embodiment uses a single lens which is a plastic lens having been molded by a molding process. However, as long as a molded lens, the invention is applicable also to a glass molded lens.

Denoted in the drawing at 1 is light source means which may comprise a semiconductor laser, for example. Denoted at 2 is a collimator lens, and denoted at 3 is a stop for restricting the light flux (light quantity). Denoted at 4 is a cylindrical lens.

Denoted at 5 is a light deflector which comprises a polygonal mirror, being rotated in a direction of an arrow by driving means such as a motor, for example. Denoted at 61 is a scanning optical element having fθ characteristic and, in this embodiment, it is constituted by a single lens. Denoted at 8 is a photosensitive drum which is the surface to be scanned.

A divergent light beam emitted from the semiconductor laser (light source means) 1 is transformed by the collimator lens 2 into substantially parallel light. While the light quantity thereof is restricted by the stop 3, this light beam enters the cylindrical lens 4. As regards the major scan direction, the light beam is directly incident on the polygonal mirror (light deflector) 5 as it is. As regards the minor scan direction, on the other hand, the light beam is imaged by the cylindrical lens 4 at about the polygonal mirror surface. Thus, the light beam incident on the polygonal mirror 5 forms a liner image being elongated in the major scan direction.

The light beam incident on the polygonal mirror 5 is scanningly deflected toward the scanning optical element, with the rotation of the polygonal mirror 5 by the motor, in the direction of arrow, and the light beam is incident on the scanning optical element 61 having fθ characteristic. The scanning optical element 61 has different refracting powers in the major scan direction and in the minor scan direction, respectively. It functions to image the deflected light beam from the polygonal mirror upon the surface to be scanned, and also it serves to correct fall (tilt) of the polygonal mirror surface. The light beam incident on the scanning optical element 61 is imaged thereby on the surface 8 to be scanned, such that the surface 8 (photosensitive drum surface, for example) is optically scanned with the light beam.

The surface shape of a refractive surface in this embodiment may be represented by configuration expression equations as follows.

Taking the point of intersection with an optical axis as an origin, the optical axis direction as x axis, an axis orthogonal to the optical axis within the major scan plane as y axis, and an axis orthogonal to the optical axis within the minor scan plane as z axis, then the direction of a meridional line (generating line) corresponding to the major scan direction is given by:

$$x=\{(Y^2/R)/[1+(1-1+K)(Y/R)^2)^{1/2}]\}+B_4Y^4+B_6Y^6+B_8Y^8+B_{10}Y^{10}$$

where R is a curvature radius of the meridional line on the optical axis, and K, $B_4$, $B_6$, $B_8$ and $B_{10}$ are aspherical coefficients.

The direction of sagittal line corresponding to the minor scan direction (a direction containing the optical axis and being orthogonal to the major scan direction) is given by:

$$S=(Z^2/r')/[1+(1-(Z^2/r')^2)^{1/2}]$$

$$r'=r_0(1+D_2Y^2+D_4Y^4+D_6Y^6+D_8Y^8+D_{10}Y^{10}$$

where $r_0$ is the curvature radius of the sagittal line on the optical axis, and $D_2$, $D_4$, $D_6$, $D_8$ and $D_{10}$ are coefficients.

The curvature radius r' of the sagittal line off the optical axis is defined in a plane containing a normal to the meridional line at each position and being perpendicular to the major scan plane. Also, while the polynomial in the configuration expression equations is expressed in terms of a function up to tenth order, the order may be higher or lower than this.

In order to solve the problems described hereinbefore, a scanning optical element according to this embodiment of the present invention is provided with three functions as follows.

a) Correction of Minor-Scan Field Curvature and Surface Fall (Tilt)

A linear image adjacent to the polygonal mirror reflection surface is re-imaged adjacent to the surface to be scanned, and, within the image effective region, curvature of field in the minor scan direction is corrected. Also, fall or tilt of the polygonal mirror is corrected.

b) Making Constant the Minor Scan Magnification of the Scanning Optical Element Within the Image Effective Region The imaging magnification of the scanning optical element in the minor scan direction (hereinafter, "minor scan magnification") is made approximately constant within the image effective region, by which the minor scan direction $F_{no}$ of the light beam incident on the surface to be scanned is regularized and the minor scan spot diameter within the image effective region is made uniform. Also, in a multiple-beam scanning optical device, the spacing of adjacent scan lines is made constant. From a practical standpoint as of a scanning optical device, the difference in imaging magnification in the minor scan direction within the image effective region should be kept to be not greater than 10%, more desirably, not greater than 5%.

Further, if the scanning optical element as a whole is deviated in a direction (hereinafter, "Z direction") perpendicular to the major scan plane, due to an error in lens assembling to an optical casing (barrel) or an error in lens production itself, once the minor scan magnification of the scanning optical element is made approximately constant, then the scan line on the surface to be scanned can be shifted uniformly such that a curvature of scan line due to the deviation can be avoided.

c) Making Constant the Minor Scan Magnification of Each Optical Surface of the Scanning Optical Element Within the Image Effective Region If in a molded lens there occurs a Z-direction deviation of a light exit surface, relative to a light entrance surface, due to insufficient precision in molding, once the minor scan magnification at each optical surface of the scanning lens is made approximately constant, then, a curvature of scan line at the surface to be scanned due to the deviation can be avoided, similarly. Particularly, since a surface which has a large refractive power in minor scan direction on the optical axis shows a high sensitivity to a deviation, making constant the minor scan magnification of the optical surface thereof is essential.

From a practical standpoint as of a scanning optical device, the difference in imaging magnification in the minor scan direction (minor scan magnification) at such optical surface as having a large refractive power in the minor scan direction on the optical axis, within the image effective region, should be kept to be not greater than 10%, more desirably, not greater than 5%. Here, the minor scan magnification at an optical surface is a scale as represented by the ratio between an object distance and an image distance with respect to that optical surface. Also, it is a quantity that corresponds to the amount of change in light incidence position on the surface to be scanned, per a unit amount, as the optical surface is deviated in Z direction.

In place of this scale, the refractive power ratio of the scanning optical element in the minor scan direction may be made constant, at such optical surface (x surface) as having a large refractive power in the minor scan direction on the optical axis is large. By doing so, similar effects are attainable. In that case, the following condition should be satisfied.

$$0.9 \phi m/\phi p \leq \phi mx/\phi px \leq 1.1 m/\phi p \tag{1}$$

The refractive power of a third optical element in the minor scan direction is φp (axial) and φm (most abaxial), and the refractive power of the same optical element at the x surface in the minor scan direction is φpx (axial) and φmx (most abaxial). Here, regarding φm and φmx, the refraction in the major scan direction has to be taken into account. For example, it can be calculated by:

$$\phi mx=(n_i \cos\theta_i - n_o \cos\theta_o)/r$$

where $n_o$ is an object side refractivity, $n_i$ is an image side refractivity, $\theta_o$ is an object side incidence angle, and $\theta_i$ is an image side incidence angle.

In accordance with the present invention, as a specific procedure for embodying the above, the scanning optical element is provided by a single lens, and the above-described three items a), b) and c) are accomplished by satisfying the following points.

1) The shape of the light exit surface of the scanning optical element in the major scan direction is determined so that the minor scan magnification within the image effective region is made substantially constant.
2) Almost all the refractive power in the minor scan direction is given to the light exit surface of the scanning optical element.
3) The curvature of the light exit surface of the scanning optical element in the minor scan direction changes continuously from an axial point to an abaxial point, in the major scan direction.

Figure 3:
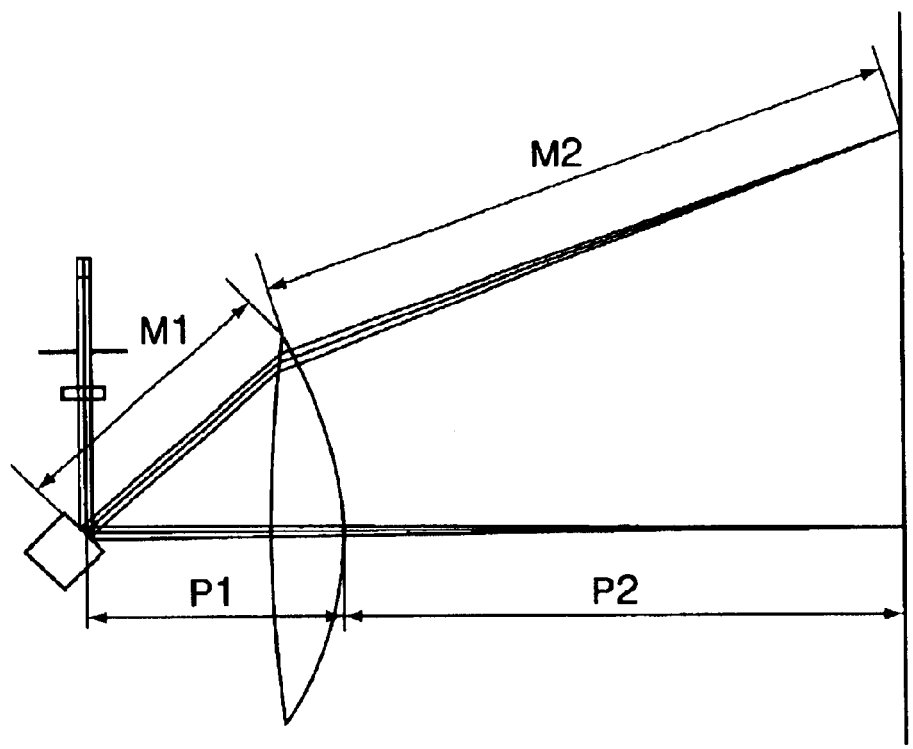
FIG. 3 is a schematic view for explaining a major scan shape effective to make the minor scan magnification constant.

The main scan shape for making the minor scan magnification constant is, as shown in FIG. 3, such a shape which is effective to make the ratio between the distance P1 or M1, converted with air, from the polygonal mirror surface (deflection surface) to the light exit surface of the scanning optical element (inside a lens, converted with "actual distance"/"refractivity") and the distance P2 or M2 from the light exit surface to the surface to be scanned, substantially constant within the image effective region. It may be an optical surface of approximately circular shape having a curvature center at the deflector side. By placing almost all the power in the minor scan direction at that optical surface, the minor scan magnification of the scanning optical element can be made substantially constant within the image effective region. Additionally, the minor scan magnification at the light exit surface becomes substantially constant. From a practical standpoint as of a scanning optical device, the amount of a change in the ratio between the distance, converted with air, from the polygonal mirror surface (deflection surface) to the light exit surface of the scanning optical element and the distance from the light exit surface to the surface to be scanned, should be kept to be not greater than 10%, more preferably, not greater than 5%.

By this, only with use of the structure that the power of the scanning optical element 61 in the minor scan direction is concentrated at the light exit surface 61b and that the curvature radius of the sagittal line changes continuously as it moves away from the optical axis in the main scan direction, both the curvature of field in the minor scan direction and the minor scan magnification can be made uniform over the whole scan effective region on the surface 8. They can be well corrected at the same time.

Here, as regards oscillation of the deflection surface which might be produced because of the absence of the rotational center on the polygonal mirror 5 surface, it can be disregarded since the amount is very small.

In order to reduce sensitivity of the scan line curvature, it is desirable that the power of the imaging optical system in the minor scan direction is concentrated at one surface of a single lens. Where the power in the minor scan direction is shared by plural optical elements or plural surfaces, not only the scan line curvatures produced by errors in disposition of respective optical elements may be integrated but also a scan line curvature produced by an optical element disposed at the light deflector side may be amplified by an error in disposition of an optical element disposed at the scanned surface side. In consideration of this, for reduction of sensitivity of the scan line curvature, it will be a best way to provide an imaging optical system by a single lens and to approximately concentrate the power in the minor scan direction at one surface of the single lens. As regards the level of power concentration in the minor scan direction, with respect to all the minor scan power of a single lens, from a practical standpoint as a scanning optical device, it should be not less than 90%, preferably, not less than 95%.

FIG. 4 shows design data in this embodiment.

In this embodiment, the scanning optical element 61 has a light entrance surface which is formed with an aspherical shape in the major scan direction, and it is formed with a cylindrical surface having a flat face in the minor scan direction. The light exit surface is formed with a circular shape in the major scan direction and, in the minor scan direction, it is formed with a deformed toric face having a circular shape different from that of the major scan direction and a curvature which changes in accordance with the major scan direction.

The major scan shape of the light exit surface is determined in accordance with item 1) described above and so that the minor scan magnification becomes substantially constant within the image effective region. Also, the refractive power in the minor scan direction is concentrated at the light exit surface.

The refractive power in the minor scan direction of the scanning optical element as a whole and at the light exit surface where the refractive power in the minor scan direction on the optical axis is largest, is such as shown in Table 1 below, and condition (1) is satisfied.

TABLE 1

|  | LIGHT EXIT SURFACE |  | SCANNING OPTICAL ELEMENT |
|---|---|---|---|
| AXIAL: øpx | 2.22 E-2 | øp | 2.22 E-2 |
| MOST ABAXIAL: ømx | 1.94 E-2 | øm | 1.94 E-2 |
| REFRACTIVE POWER RATIO: ømx/øpx | 0.874 | øm/øp | 0.874 |

In the scanning optical device of this embodiment, the distance, converted with air, from the deflection surface 5a of the polygonal mirror to the light exit surface 61b of the scanning optical element 61 along the optical axis (inside a lens, "actual distance"/"refractivity") is $L_{a0}$=63.193 mm. The distance from the light exit surface 61b of the scanning optical element 61 to the surface 8 to be scanned is $L_{b0}$=147.283 mm. The distance, converted with air, from the deflection surface 5a of the polygonal mirror, off the axis, to the light exit surface 61b of the scanning optical element 61 is $L_{a\theta}$=72.843 mm. The distance from the light exit surface 61b of the scanning optical element 61 to the surface 8 to be scanned is $L_{b\theta}$=170.742 mm. It follows that:

$$(L_{b\theta}/L_{a\theta})=1.0057\times(L_{b0\theta}/L_{a0}) \quad\quad\quad a)$$

Thus, the main scan direction shape (meridional line shape) of the surfaces 61a and 61b (particularly, the light exit surface 61b) is determined so as to satisfy the following relation:

$$0.9\times(L_{b0}/L_{a0})\leq(L_{b\theta}/L_{a\theta})\leq1.1\times(L_{b0}/L_{a0}) \quad\quad\quad b)$$

The calculation is made while the point of intersection between the deflection surface 5a and the principal ray of the incident light when the most abaxial portion is to be scanned, is taken as an origin for X and Y coordinates.

The ratio of $F_{no}$ in the minor scan direction is given by $$F_{min}/F_{max} = 0.982 \geq 0.9$$

and it is seen that the condition for providing a constant minor scan magnification is satisfied.

If the optical path length of the above-described imaging optical system is L and the focal length thereof is f, there is a relation:

$$1.35f \leq L = 1.45 \leq 1.55f$$

The shape of the light exit surface in the major scan direction is determined so as to make the minor scan magnification constant and, additionally, the relationship between the optical path length and the focal length that is effective to well correct the curvature of field in the main scan direction and the fθ characteristic, is satisfied.

If the power of the whole system of the above-described imaging optical system in the minor scan direction is øs, and the power of the light exit surface (second surface) in the minor scan direction is øs2, there is a relation:

$$0.9 \leq \emptyset s2/\emptyset s = 1.0 \leq 1.1$$

With the concentration of the power in the minor scan direction at the light exit surface, it is assured to provide a system in which the scan line curvature sensitivity to disposition is low.

Figure 5A:
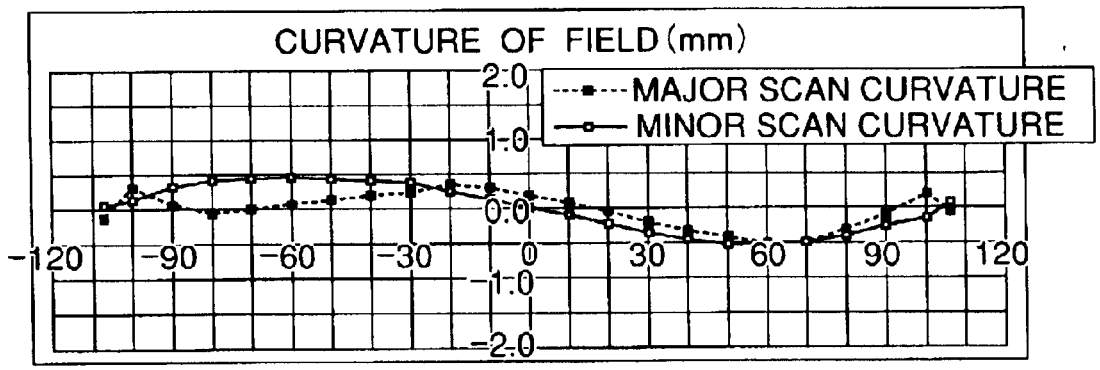
FIGS. 5A–5C are graphs for illustrating geometric aberrations and minor scan magnification difference in the first embodiment.
Figure 5B:
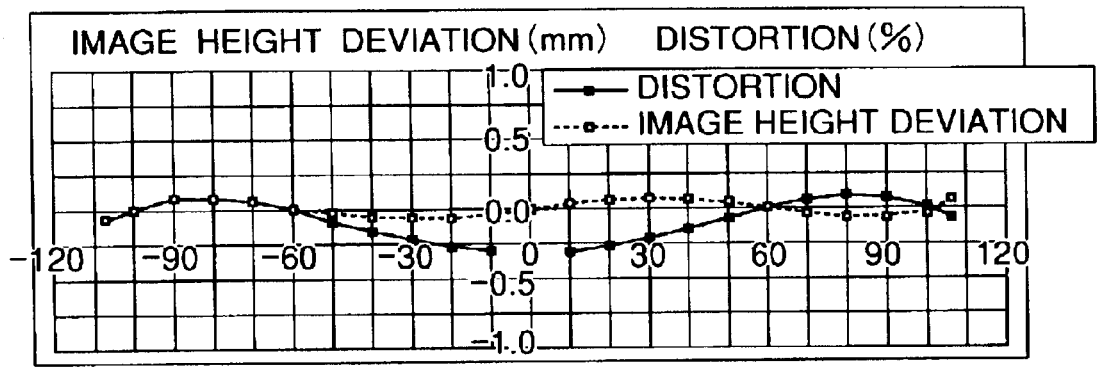
Figure 5C:
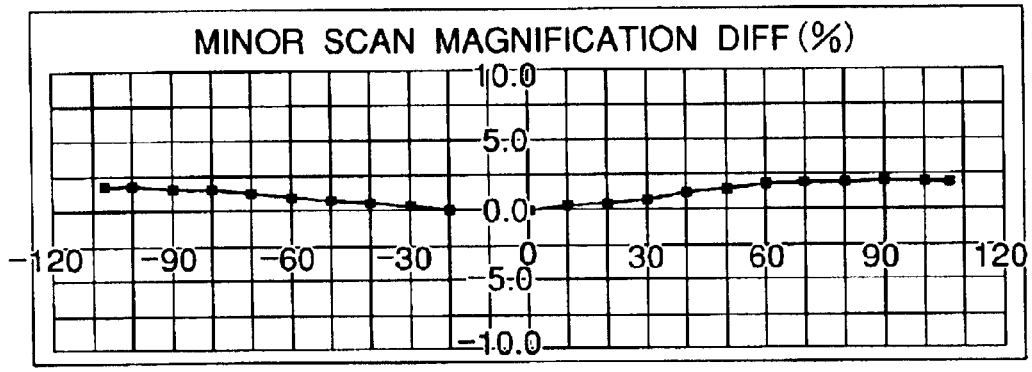

FIGS. 5A–5C show geometrical aberrations and minor scan magnification difference of the scanning optical element, in this embodiment, and it is seen that they are corrected well. The minor scan magnification difference within the image effective region is:

at light entrance surface: 0% (plane)
at light exit surface: 1.4%.

Thus, it is seen that, at the light exit surface where the refractive power in the minor scan direction on the optical axis is largest, the minor scan magnification is substantially constant within the image effective region.

Figure 6:
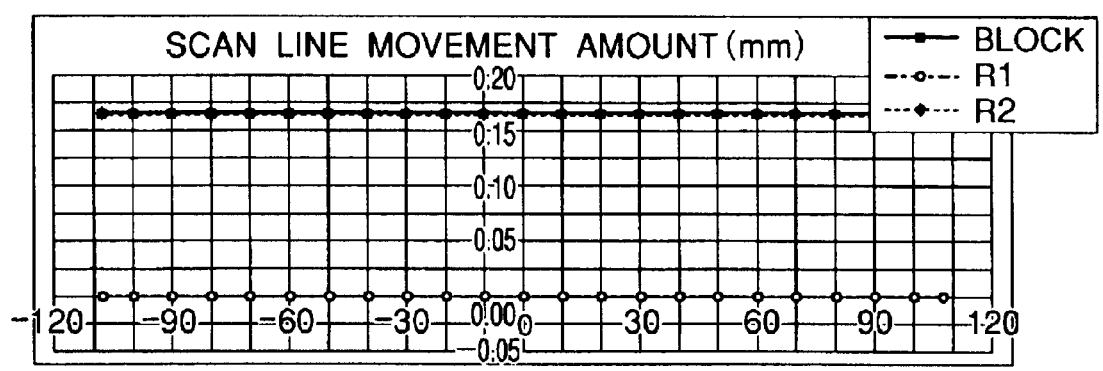
FIG. 6 is a graph for illustrating a shift amount of scan line due to deviation of a scanning optical element, in the first embodiment.

FIG. 6 shows the shift amount of scan line (in Z direction) on the surface to be scanned, where, in this embodiment, the scanning optical element as a whole and each optical surface thereof are deviated in Z direction by a deviation amount 50 microns. It is seen from the drawing that, although the light incidence position displaces due to the deviation, the amount of scan line curvature (curve) produced is very small.

In FIG. 6, a curve R1 depicts the amount of scan line curvature where only the light entrance surface of the fθ lens 61 is deviated. Curve R2 depicts the amount of scan line curvature where only the light exit surface of the fθ lens 61 is deviated. A block curve depicts the amount of scan line curvature where both the light entrance surface and the light exit surface of the fθ lens 61 are deviated.

Namely, it is seen from the results shown in FIG. 6 that, even if the scanning lens as a whole is deviated in a direction (Z direction) perpendicular to the scan plane, due to an error in lens assembling to an optical casing (barrel) or an error in lens production itself, once the minor scan magnification of the scanning lens is made approximately constant, then the scan line on the surface to be scanned can be shifted uniformly such that a curvature of scan line due to the deviation can be avoided.

Also, it is seen from the results shown in FIG. 6 that, particularly in a molded lens, even if there occurs a Z-direction deviation of a light exit surface, relative to a light entrance surface, due to insufficient precision in molding, once the minor scan magnification at each optical surface of the scanning lens is made approximately constant, then, a curvature of scan line at the surface to be scanned, in the minor scan direction, due to the deviation can be avoided, similarly.

In this embodiment, as described above, a scanning optical element is constituted by a single lens having a cylindrical surface and a deformed toric surface, and the minor scan magnification of the scanning optical element and that of each optical surface thereof are made substantially constant, within the image effective region. With this arrangement, even if there occurs a deviation of the scanning optical element as a whole or a deviation of each optical surface thereof, due to a disposition error or production error, a curvature of scan line can be avoided. Thus, the present embodiment accomplishes such a scanning optical device on the basis of a single lens and at a low cost.

[Second Embodiment]

Figure 7:
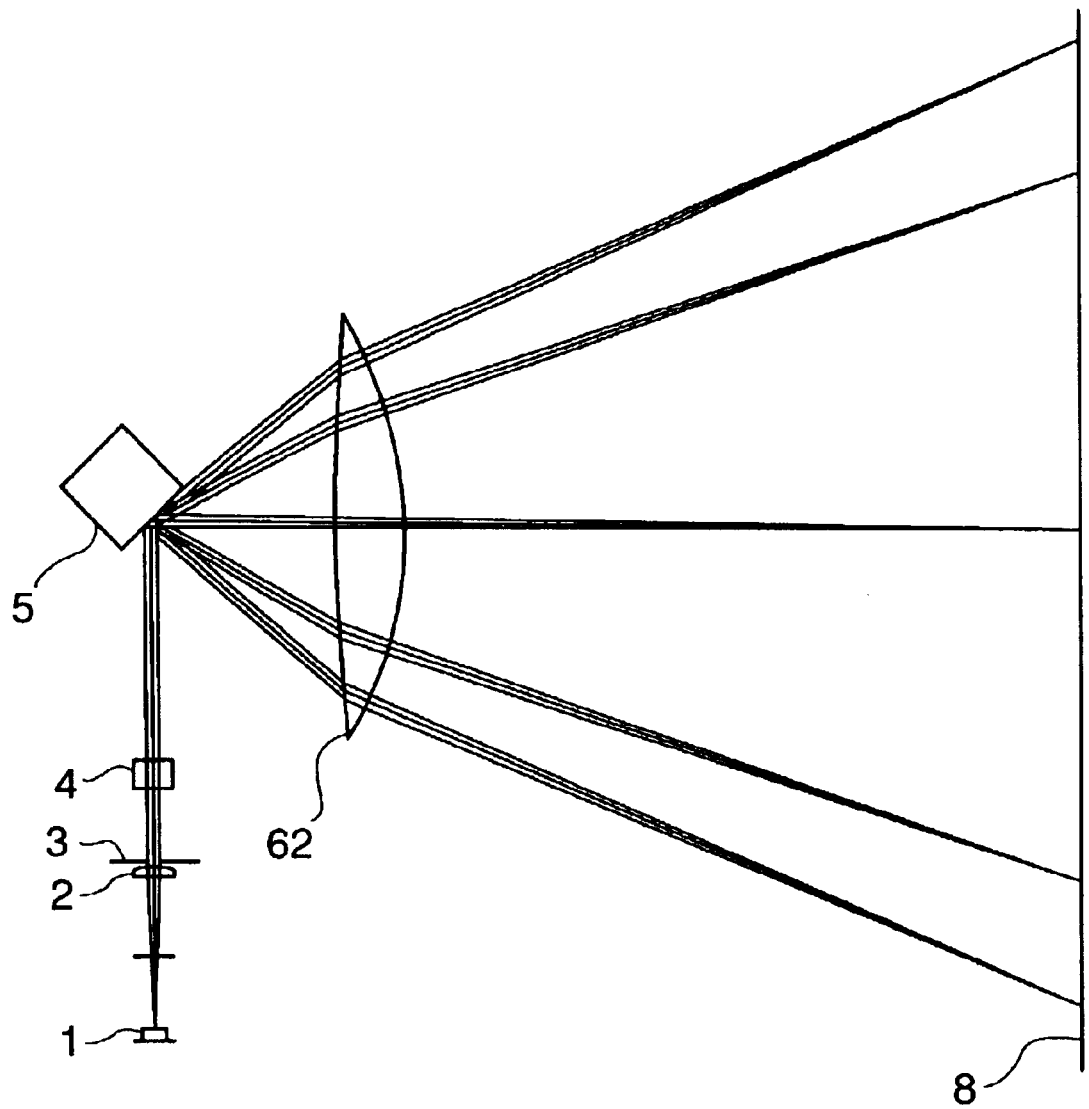
FIG. 7 is a sectional view of a scanning optical device according to a second embodiment of the present invention, in a major scan direction.
Figure 8:
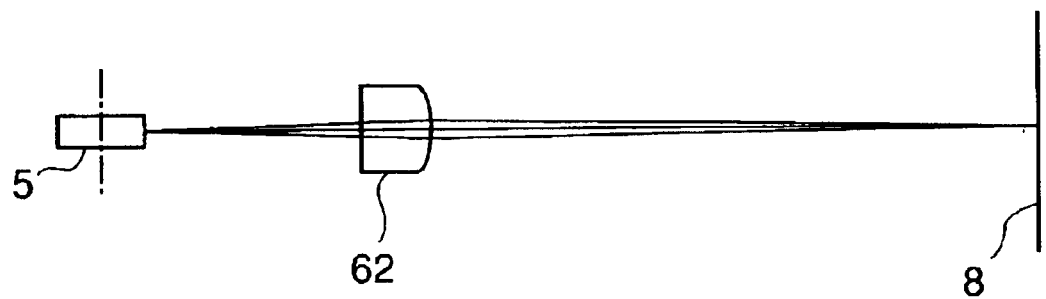
FIG. 8 is a sectional view of a scanning optical device according to the second embodiment of the present invention, in a minor scan direction.

FIG. 7 is a sectional view of a scanning optical device according to a second embodiment of the present invention, in the major scan direction, and FIG. 8 is a sectional view in the minor scan direction. The second embodiment differs from the first embodiment in that a multiple-beam laser is used as a light source, that a scanning optical device is incorporated into a color image forming apparatus, and that the shapes of a light entrance surface and a light exit surface of a scanning optical element are changed. The remaining portion is similar to the first embodiment.

Figure 9:
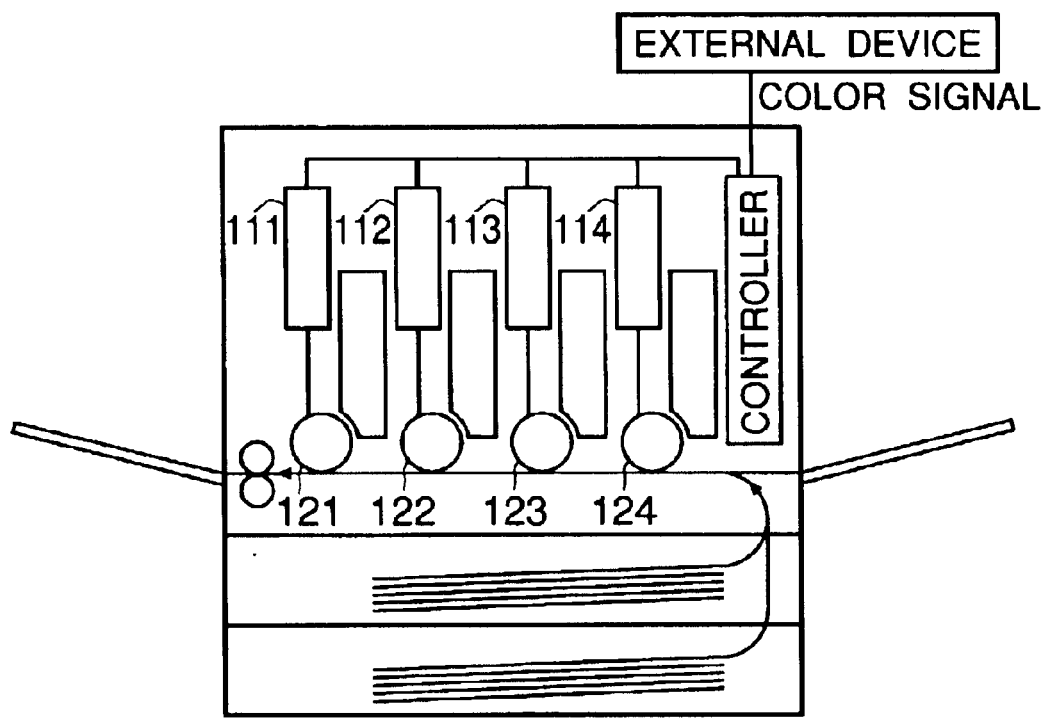
FIG. 9 is a sectional view of a color image forming apparatus.

Denoted in the drawing at 11 is a multiple-beam laser (light source), and it produces two light beams simultaneously (only one is illustrated in the drawing) which are modulated independently of each other. In this embodiment, this scanning optical device is incorporated into a color image forming apparatus such as shown in FIG. 9. More specifically, the apparatus shown in FIG. 9 is a color image forming apparatus in which plural light beams from plural scanning optical devices are directed to corresponding image bearing members, respectively, so as to record image information of different colors thereon.

FIG. 10 illustrates design data in this embodiment.

In this embodiment, a scanning optical element 62 has a light entrance surface which is formed with an aspherical shape in the major scan direction and, in the minor scan direction, it is formed with a convex toric face having a small refractive power. As regards the light exit surface, it is formed with an aspherical shape in the major scan direction and, in the minor scan direction, it is formed with a deformed toric surface having a circular shape different from the major scan direction and having a curvature which changes in accordance with the major scan direction.

The major scan shape of the light exit surface is determined in accordance with item 1) described hereinbefore, and so that the minor scan magnification becomes substantially constant within the image effective region. Further, as regards the refractive power in the minor scan direction, although a small amount is distributed to the light entrance surface side, most of the power is concentrated at the light exit surface. The refractive power distribution at the light entrance surface side may be not greater than 10% of the refractive power of the scanning optical element, and the advantageous effects of the present invention are attainable with this condition.

Figure 11A:
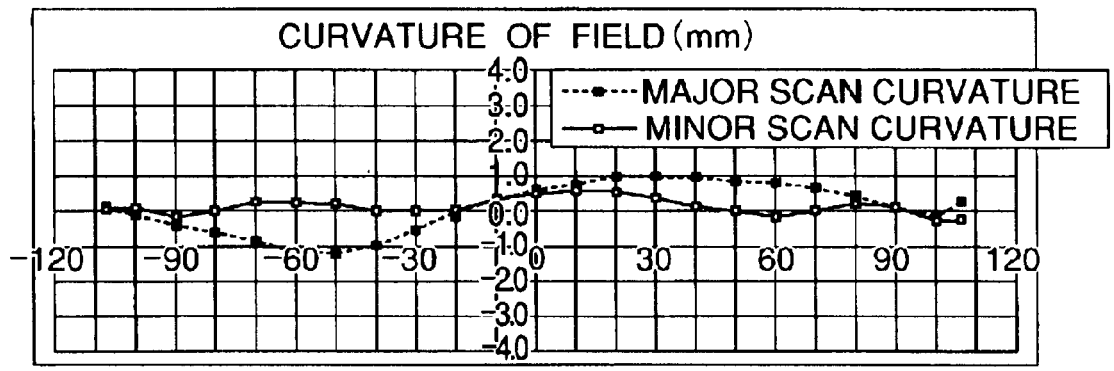
FIGS. 11A–11C are graphs for illustrating geometric aberrations and minor scan magnification difference in the second embodiment.
Figure 11B:
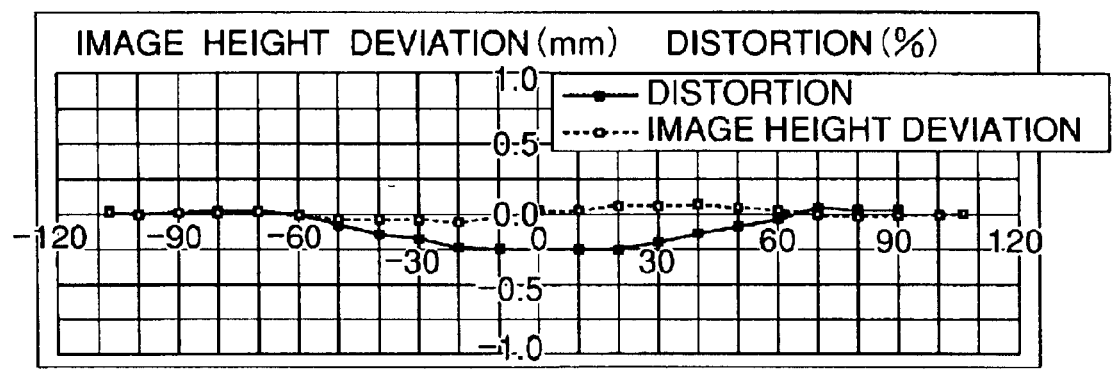
Figure 11C:
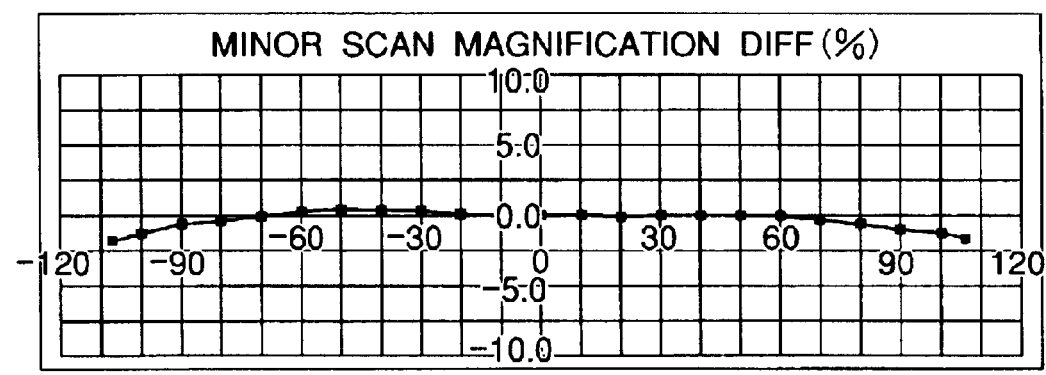

FIGS. 11A–11C show geometrical aberrations and minor scan magnification difference of the scanning optical element, in this embodiment, and it is seen that they are corrected well. The refractive power in the minor scan direction of the scanning optical element as a whole and at the light exit surface where the refractive power in the minor scan direction on the optical axis is largest, is such as shown in Table 2 below, and condition (1) is satisfied.

TABLE 2

|  | LIGHT EXIT SURFACE |  | SCANNING OPTICAL ELEMENT |
|---|---|---|---|
| AXIAL: øpx | 2.52 E-2 | øp | 2.71 E-2 |
| MOST ABAXIAL: ømx | 2.06 E-2 | øm | 2.32 E-2 |
| REFRACTIVE POWER RATIO: ømx/øpx | 0.817 | øm/øp | 0.856 |

Further, also in this embodiment, a relation $L_{b\theta}/L_{a\theta}=0.9748\times(L_{b0}/L_{a0})$ is obtained, and this satisfies a relation:

$$0.9\times(L_{b0}/L_{a0})\leq(L_{b\theta}/L_{a\theta})\leq 1.1\times(L_{b0}/L_{a0})$$

Further, if the power of the whole system of the above-described imaging optical system in the minor scan direction is øs, and the power of the light exit surface (second surface) in the minor scan direction is øs2, there is a relation:

$$0.9\leq\theta s2/\theta s=0.932\leq 1.1$$

Figure 12:
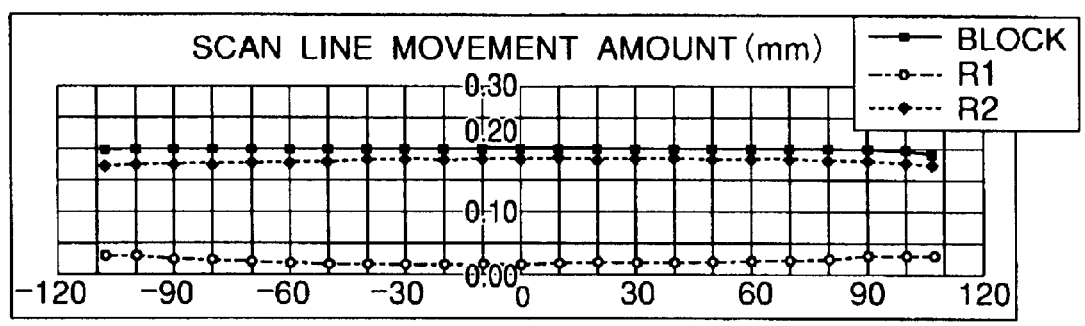
FIG. 12 is a graph for illustrating a shift amount of scan line due to deviation of a scanning optical element, in the second embodiment.

FIG. 12 shows the shift amount of scan line (in Z direction) on the surface to be scanned, where, in this embodiment, the scanning optical element as a whole and each optical surface thereof are deviated in Z direction by a deviation amount 50 microns. It is seen from the drawing that, although the light incidence position displaces due to the deviation, the amount of scan line curvature (curve) produced is very small.

In this embodiment, as described above, a scanning optical element is constituted by a single lens having a cylindrical surface and a deformed toric surface, and the minor scan magnification of the scanning optical element and that of each optical surface thereof are made substantially constant, within the image effective region. With this arrangement, even if there occurs a deviation of the scanning optical element as a whole or a deviation of each optical surface thereof, a curvature of scan line can be avoided. Thus, the present embodiment accomplishes such a scanning optical device on the basis of a single lens and at a low cost.

Further, as an advantageous effect peculiar to this embodiment, as a result of a constant minor scan magnification of the scanning optical element accomplished within the image effective region, the spacings of scan lines, on the surface to be scanned, defined by plural light beams in the scanning optical device used with multiple beams can be made uniform. Thus, a scanning optical device with which high precision image forming operation is attainable is provided.

Further, as a result of uniforming the minor scan magnifications at respective optical surfaces of the scanning optical element, a color image forming apparatus in which no scan line curvature is produced by a production error or the like of the element and in which adjustment of scan line curvature (curve) is unnecessary and color misregistration is small, can be accomplished.

[Third Embodiment]

Figure 13:
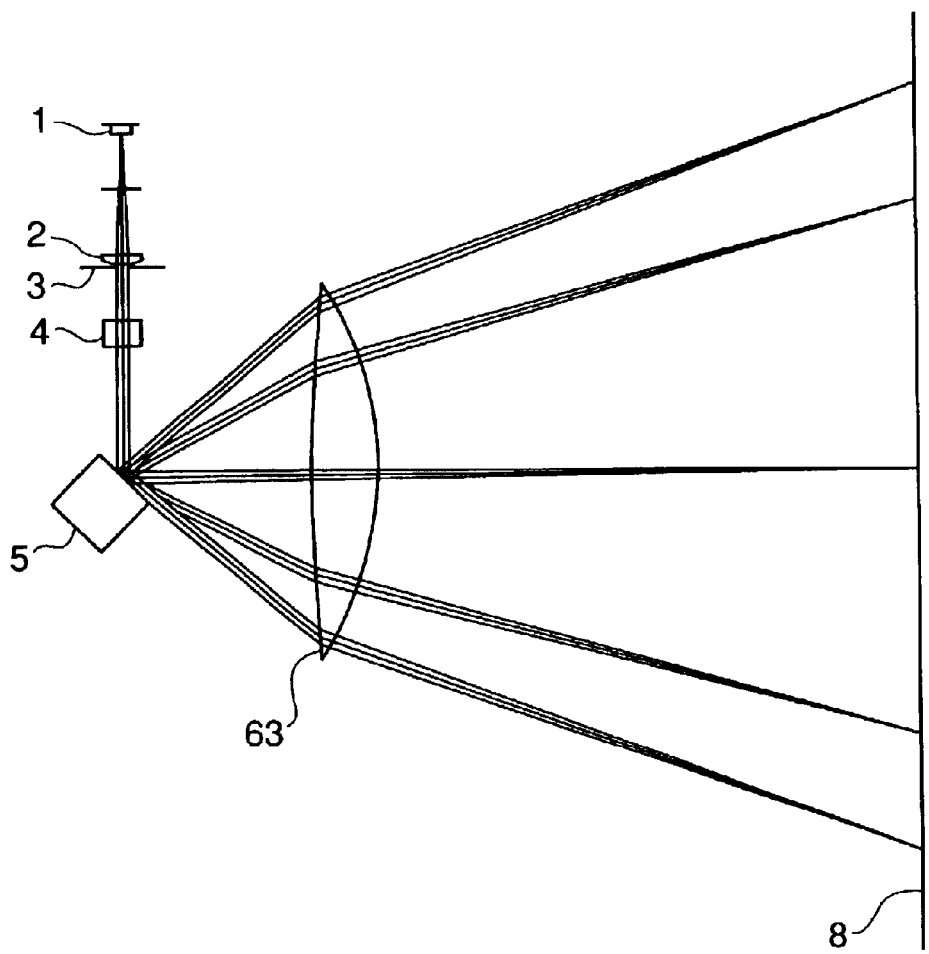
FIG. 13 is a sectional view of a scanning optical device according to a third embodiment of the present invention, in a major scan direction.
Figure 14:
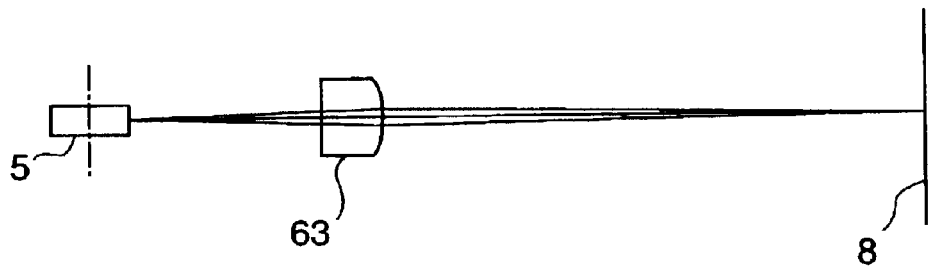
FIG. 14 is a sectional view of a scanning optical device according to the third embodiment of the present invention, in a minor scan direction.

FIG. 13 is a sectional view of a scanning optical device according to a third embodiment of the present invention, in the major scan direction, and FIG. 14 is a sectional view in the minor scan direction. The third embodiment differs from the first embodiment in that the shapes of a light entrance surface and a light exit surface of a scanning optical element are changed, and that a scanning optical device is incorporated into an image forming apparatus. The remaining portion is similar to the first embodiment.

FIG. 15 illustrates design data in this embodiment.

In this embodiment, a scanning optical element 63 has a light entrance surface which is formed with an aspherical shape in the major scan direction and, in the minor scan direction, it is formed with a convex toric. As regards the light exit surface, it is formed with a circular shape in the major scan direction and, in the minor scan direction, it is formed with a deformed toric surface having a circular shape different from the major scan direction and having a curvature which changes in accordance with the major scan direction.

The refractive power in the minor scan direction of the scanning optical element as a whole and at the light exit surface where the refractive power in the minor scan direction on the optical axis is largest, is such as shown in Table 3 below, and condition (1) is satisfied.

TABLE 3

|  | LIGHT EXIT SURFACE |  | SCANNING OPTICAL ELEMENT |
|---|---|---|---|
| AXIAL: øpx | 2.08 E-2 | øp | 2.24 E-2 |
| MOST ABAXIAL: ømx | 1.70 E-2 | øm | 1.95 E-2 |
| REFRACTIVE POWER RATIO: ømx/øpx | 0.817 | øm/øp | 0.871 |

Further, also in this embodiment, a relation $L_{b\theta}/L_{a\theta}=1.0057\times(L_{b0}/L_{a0})$ is obtained, and this satisfies a relation:

$$0.9\times(L_{b0}/L_{a0})\leq(L_{b\theta}/L_{a\theta})\leq 1.1\times(L_{b0}/L_{a0})$$

Further, if the power of the whole system of the above-described imaging optical system in the minor scan direction is øs, and the power of the light exit surface (second surface) in the minor scan direction is øs2, there is a relation:

$$0.9\leq\phi s2/\phi s=0.929\leq 1.1$$

The major scan shape of the light exit surface is determined in accordance with item 1) described hereinbefore, and so that the minor scan magnification becomes substantially constant within the image effective region. Further, as regards the refractive power in the minor scan direction, it is concentrated at the light exit surface.

Figure 16A:
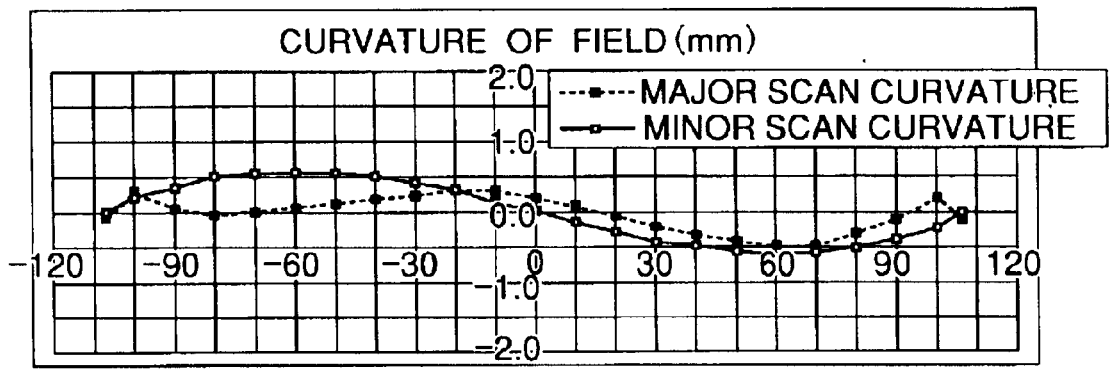
FIGS. 16A–16C are graphs for illustrating geometric aberrations and minor scan magnification difference in the third embodiment.
Figure 16B:
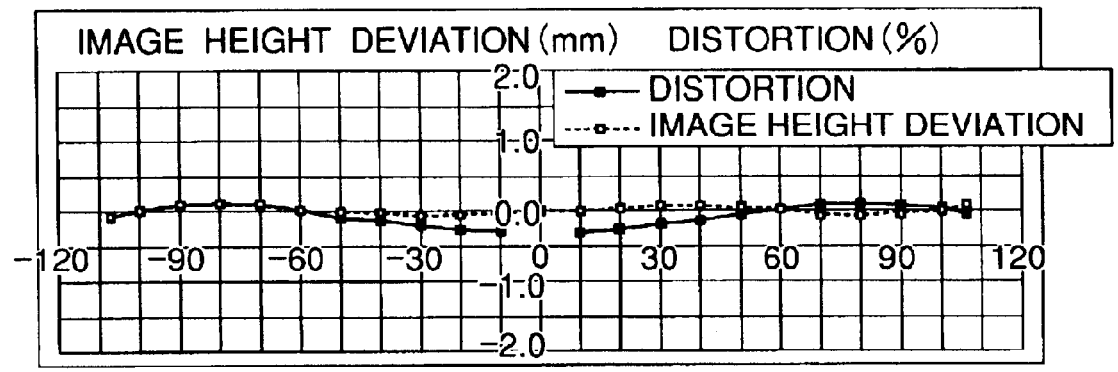
Figure 16C:
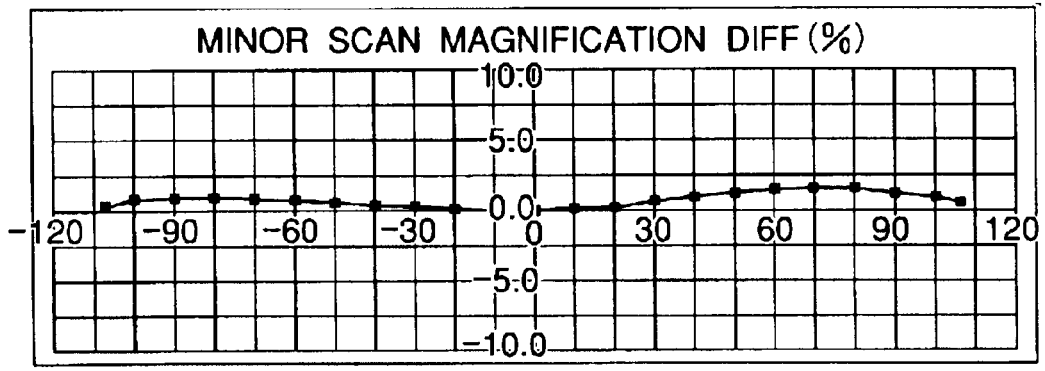

FIGS. 16A–16C show geometrical aberrations and minor scan magnification difference of the scanning optical element, in this embodiment, and it is seen that they are corrected well. The minor scan magnification difference within the image effective region is:

at light entrance surface: 65% at light exit surface: 5.3%.

Thus, it is seen that, at the light exit surface where the refractive power in the minor scan direction on the optical axis is largest, the minor scan magnification is substantially constant within the image effective region. It should be noted here that the refractive power assigned to the light entrance surface is very small and since the amount of shift of the scan line itself by a deviation of that surface is small, a large minor scan magnification difference at the light entrance surfaced does not cause inconveniences. The refractive power distribution at the light entrance surface side may be not greater than 10% of the refractive power of the scanning optical element, and the advantageous effects of the present invention are attainable with this condition.

Figure 17:
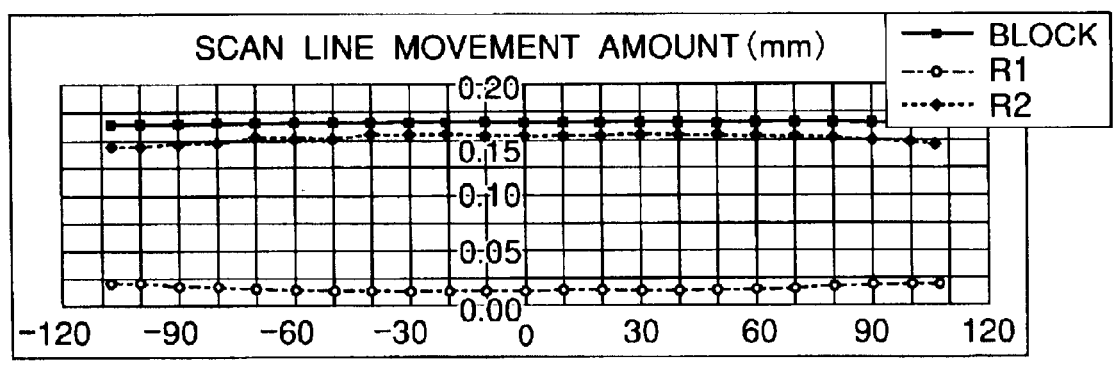
FIG. 17 is a graph for illustrating a shift amount of scan line due to deviation of a scanning optical element, in the third embodiment.
Figure 18:
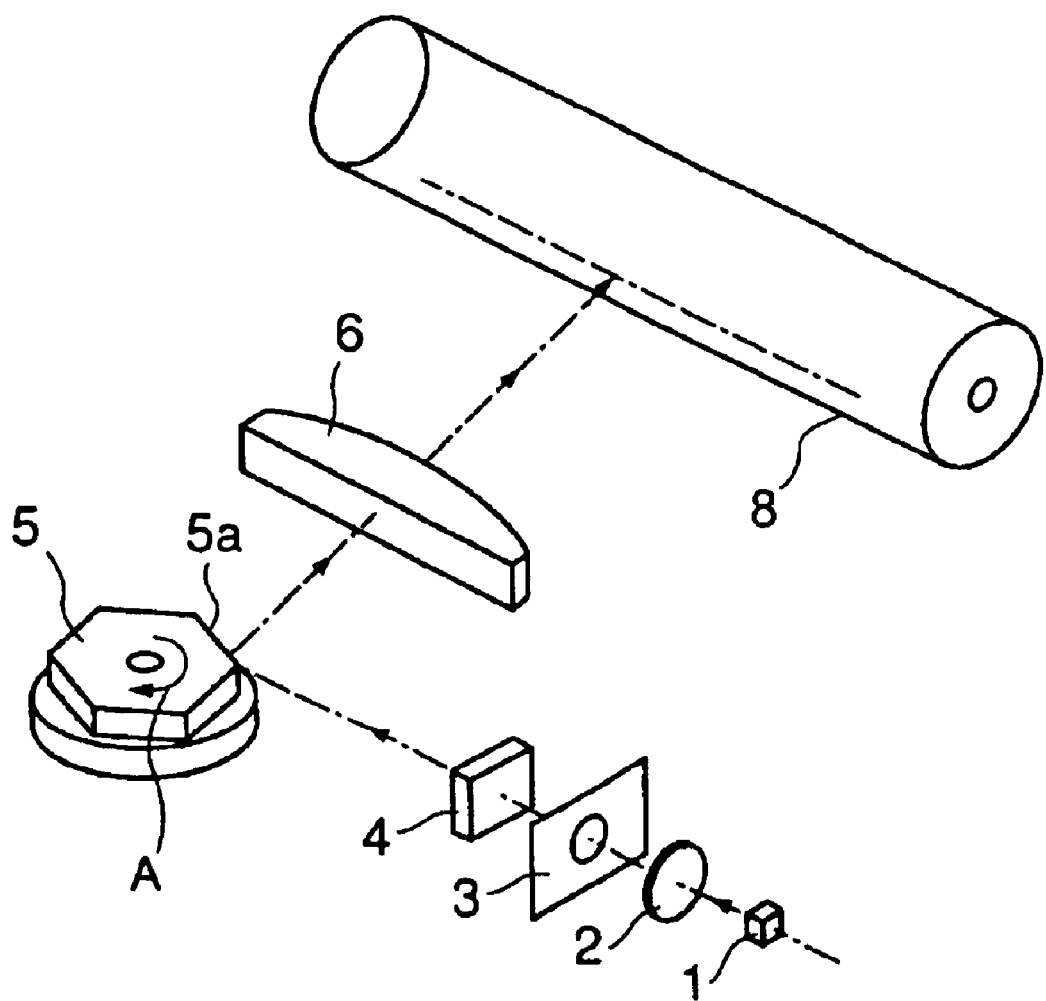
FIG. 18 is a schematic view of a conventional scanning optical device.
Figure 19:
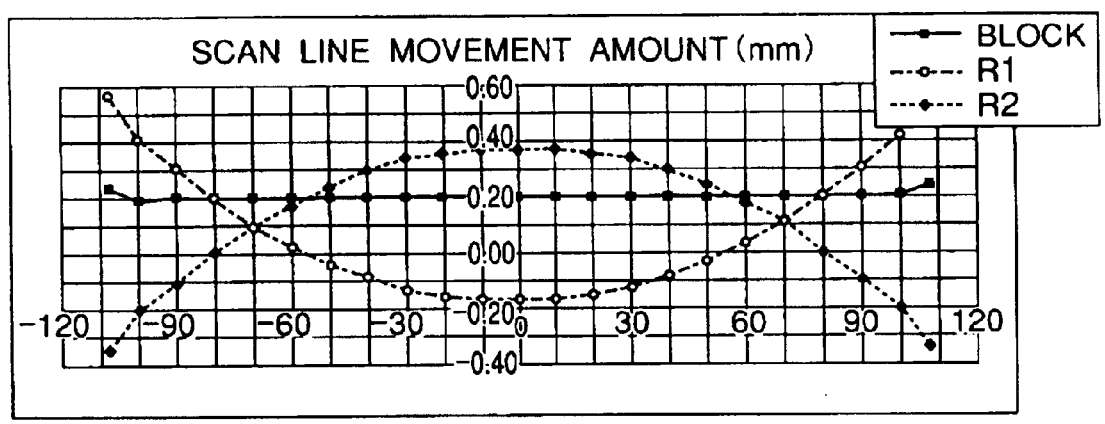
FIG. 19 is a graph for illustrating a shift amount of scan line due to deviation of a scanning optical element, in a prior art structure.

FIG. 17 shows the shift amount of scan line (in Z direction) on the surface to be scanned, where, in this embodiment, the scanning optical element as a whole and each optical surface thereof are deviated in Z direction by a deviation amount 50 microns. It is seen from the drawing that, although the light incidence position displaces due to the deviation, the amount of scan line curvature (curve) produced is very small.

[Fourth Embodiment]

Figure 21:
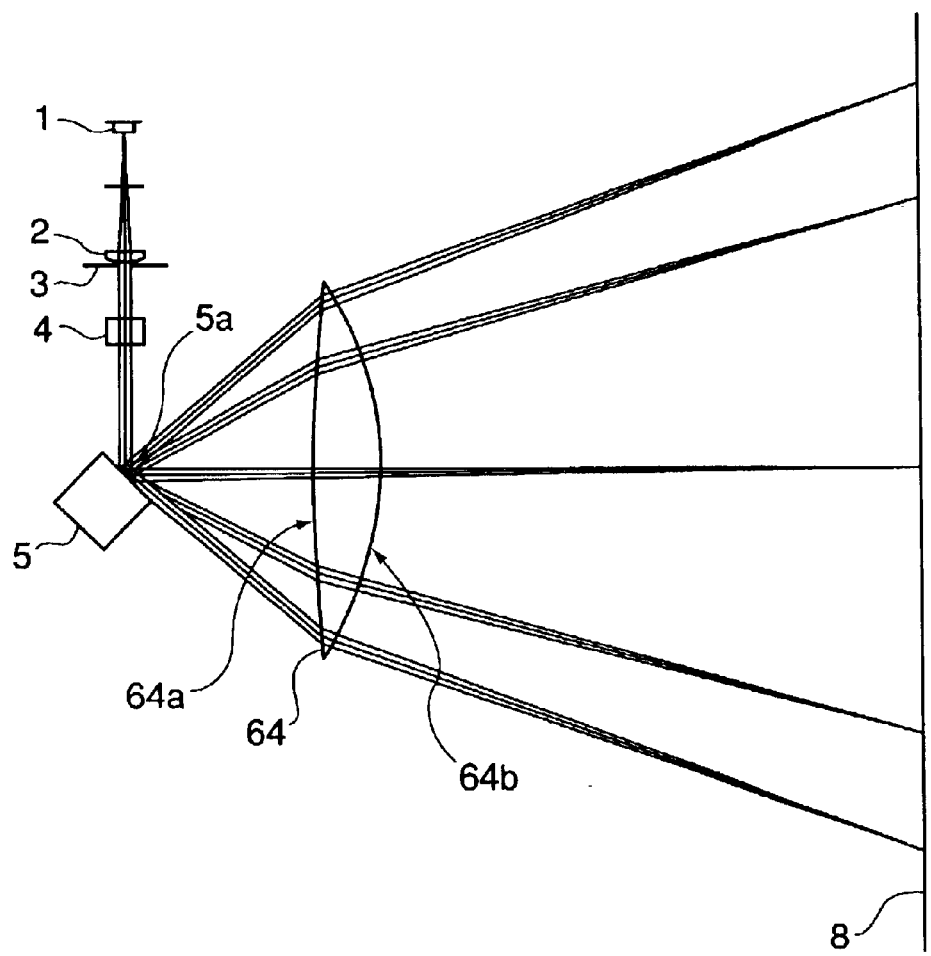
FIG. 21 is a sectional view of a scanning optical device according to a fourth embodiment of the present invention, in a major scan direction.
Figure 22:
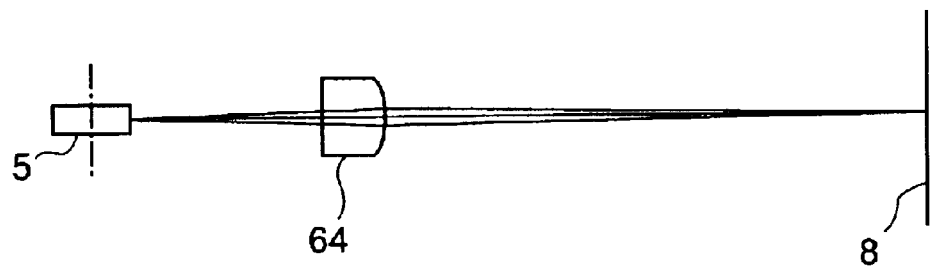
FIG. 22 is a sectional view of a scanning optical device according to the fourth embodiment of the present invention, in a minor scan direction.

FIG. 21 is a sectional view (major scan section) of a main portion of an optical scanning device according to a fourth embodiment of the present invention, in a major scan direction. FIG. 22 is a sectional view (minor scan section) of FIG. 21, in a minor scan direction.

The fourth embodiment differs from the first embodiment in that the first face of the scanning optical element has an arcuate shape in the major scan direction, and the second face has an aspherical shape. Although the shape in the major scan direction differs from that of the first embodiment, good aberration characteristics are attained and sufficient imaging characteristics are assured.

FIG. 23 illustrates various coefficients for aspherical coefficients of the scanning optical element 64 as well as other characteristics.

FIG. 24 shows coordinates of the principal ray passing through the scanning optical element 64 of this embodiment, and ray distances from the deflection surface 5a to individual surfaces.

The refractive power in the minor scan direction of the scanning optical element as a whole and at the light exit surface where the refractive power in the minor scan direction on the optical axis is largest, is such as shown in Table 4 below.

TABLE 4

|  | LIGHT EXIT SURFACE |  | SCANNING OPTICAL ELEMENT |
|---|---|---|---|
| AXIAL: ø$px$ | 2.13 E-2 | ø$p$ | 2.13 E-2 |
| MOST ABAXIAL: ø$mx$ | 1.87 E-2 | ø$m$ | 1.87 E-2 |
| REFRACTIVE POWER RATIO: ø$mx$/ø$px$ | 0.878 | ø$m$/ø$p$ | 0.878 |

In the scanning optical device of this embodiment, the distance, converted with air, from the deflection surface 5a of the polygonal mirror to the light exit surface 64b of the scanning optical element 64 along the optical axis (inside a lens, "actual distance"/"refractivity") is $L_{a0}$=67.288 mm. The distance from the light exit surface 64b of the scanning optical element 64 to the surface 8 to be scanned is $L_{b0}$=147.187 mm. The distance, converted with air, from the deflection surface 5a of the polygonal mirror, off the axis, to the light exit surface 64b of the scanning optical element 64 is $L_{a\theta}$=77.094 mm. The distance from the light exit surface 64b of the scanning optical element 64 to the surface 8 to be scanned is $L_{b\theta}$=171.095 mm. It follows that:

$$(L_{b\theta}/L_{a\theta})=1.0145\times(L_{b0}/L_{a0}) \quad \text{a)}$$

Thus, the main scan direction shape (meridional line shape) of the surfaces 64a and 64b (particularly, the light exit surface 64b) is determined so as to satisfy the following relation:

$$0.9\times(L_{b0}/L_{a0})\leq(L_{b\theta}/L_{a\theta})\leq 1.1\times(L_{b0}/L_{a0}) \quad \text{b)}$$

Figure 25A:
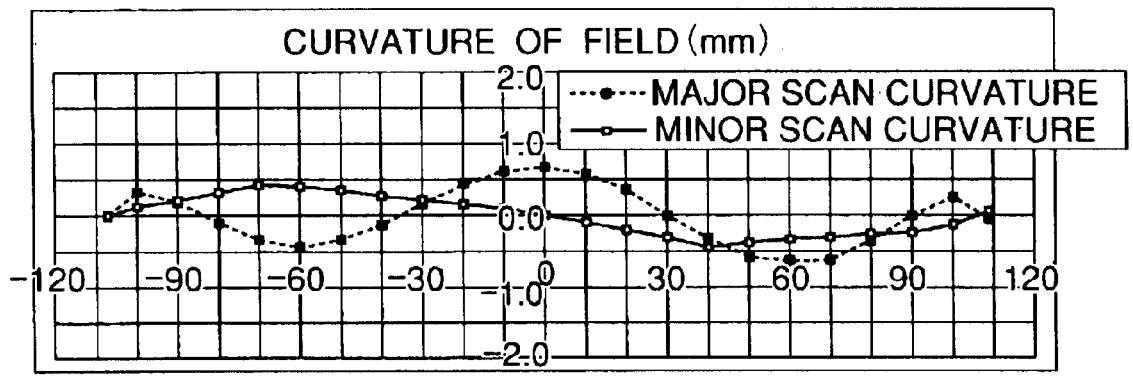
FIGS. 25A–25C are graphs for illustrating geometric aberrations and minor scan magnification difference in the fourth embodiment.
Figure 25B:
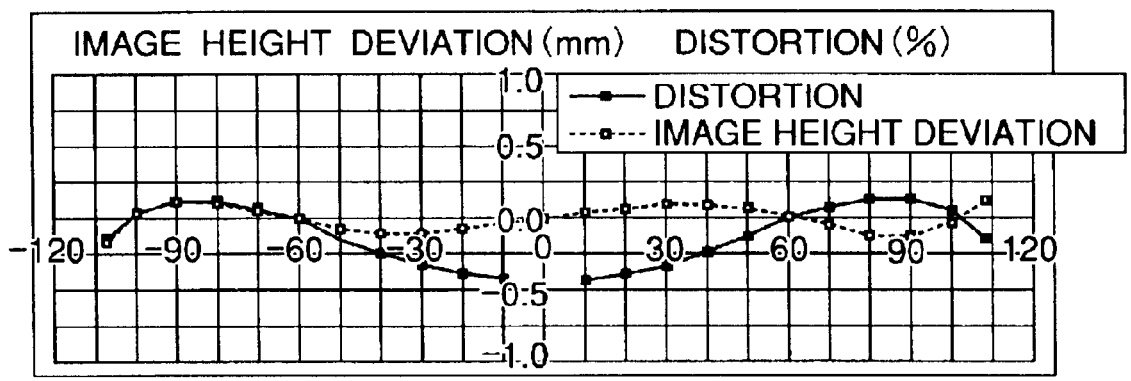
Figure 25C:
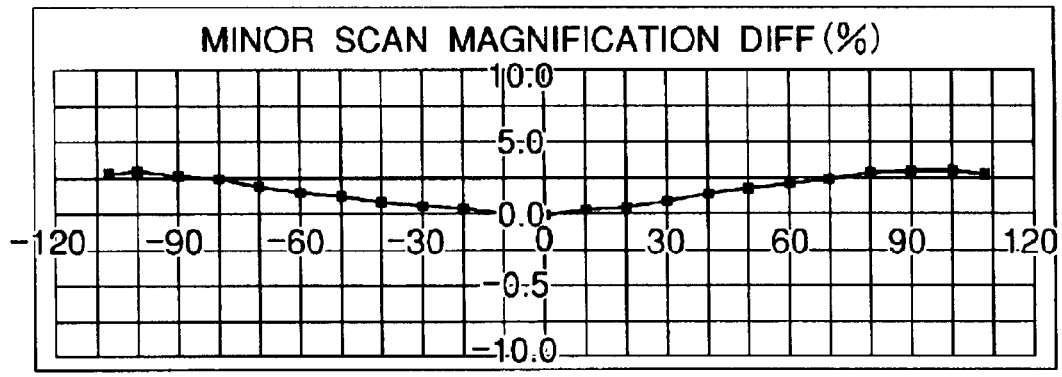

FIGS. 25A–25C illustrate paraxial aberrations (field curvature, distortion, minor scan magnification difference) of an optical scanning device according to this embodiment. A solid line in the field of curvature depicts minor scan direction, and a broken ling depicts major scan direction. It is seen from these aberration illustrations that, in this embodiment, paraxial aberrations are well corrected, and that an optical scanning device suitable for ultra fine printing is accomplished.

The ratio of $F_{no}$ in the minor scan direction is given by $$F_{min}/F_{max}=1 \geq 0.9$$

and it is seen that the condition for providing a constant minor scan magnification is satisfied.

If the optical path length of the above-described imaging optical system is L and the focal length thereof is f, there is a relation:

$$1.35f \leq L=1.487 \leq 1.55f$$

The shape of the light exit surface in the major scan direction is determined so as to make the minor scan magnification constant and, additionally, the relationship between the optical path length and the focal length that is effective to well correct the curvature of field in the main scan direction and the fθ characteristic, is satisfied.

If the power of the whole system of the scanning optical element in the minor scan direction is øs, and the power of the light exit surface (second surface) in the minor scan direction is øs2, there is a relation:

$$0.9 \leq \text{ø}s2/\text{ø}s=1.0 \leq 1.1$$

With the concentration of the power in the minor scan direction at the light exit surface, it is assured to provide a system in which the scan line curvature sensitivity to disposition is low.

Here, illustration of scan line curvature when the scanning optical element 64 is moved within the minor scan section and in Z-axis direction orthogonal to the optical axis, is omitted. It should be noted that substantially no scan line curvature is produced, like FIG. 6, and it does not reach a level to be considered in the apparatus.

Figure 20:
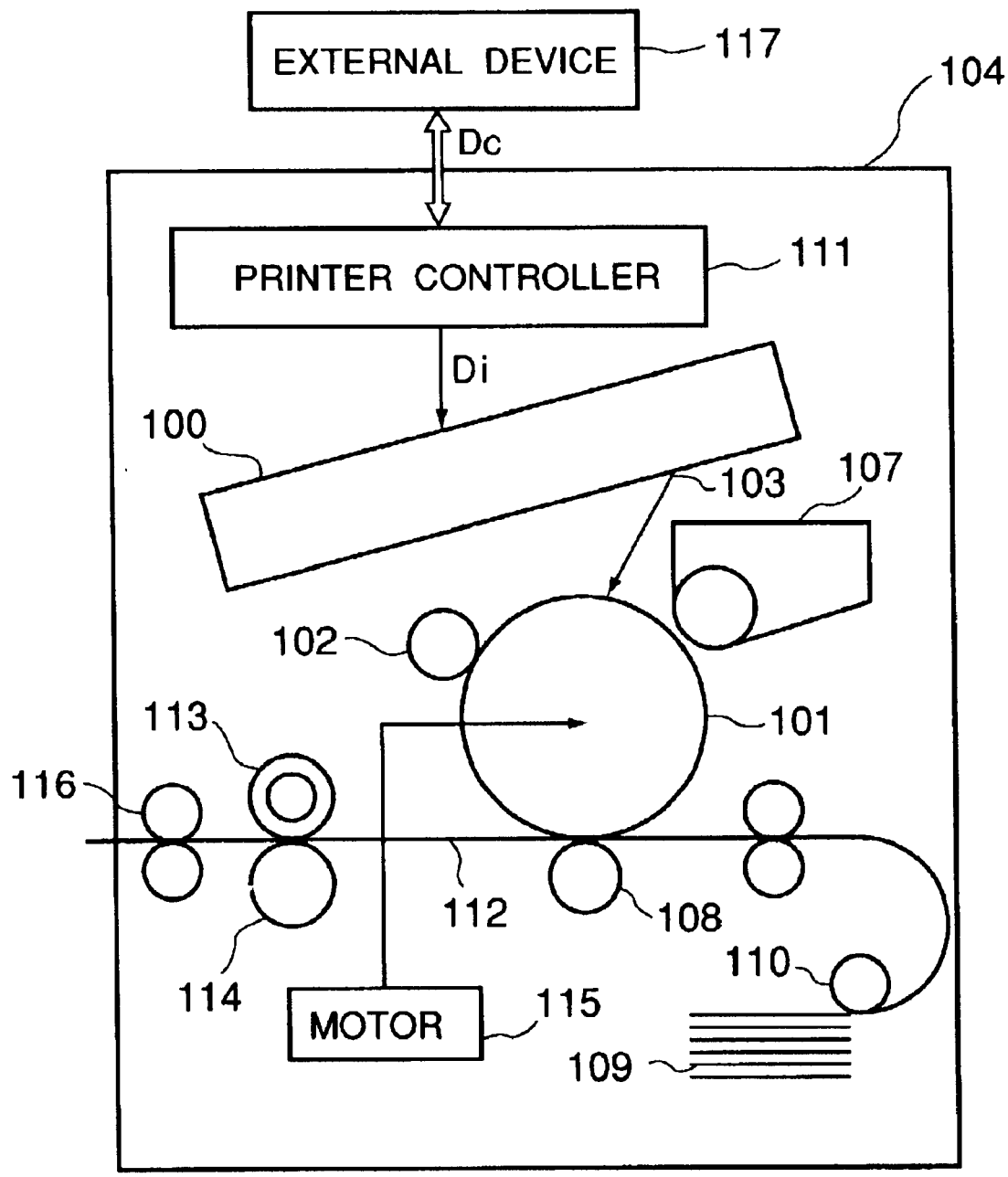
FIG. 20 is a sectional view of an image forming apparatus.

FIG. 20 is a schematic view of a main portion of an image forming apparatus according to an embodiment of the present invention, in the minor scan direction. Denoted generally at 104 in the drawing is an image forming apparatus. A code data Dc from an outside equipment 117 such as a personal computer is applied to this image forming apparatus 104. The code data is converted into an imagewise data (dot data) Di by means of a printer controller 111 inside the apparatus. The imagewise data Di is inputted into a scanning optical device 100 having a structure such as described with reference to anyone of the preceding embodiments. The scanning optical device 100 emits a light beam 103 being modulated in accordance with the imagewise data Di. A photosensitive surface of a photosensitive drum 101 is scanned in the major scan direction, by the light beam 103.

The photosensitive drum 101 which is an electrostatic latent image bearing member is rotated by a motor 115 in a clockwise direction. With this rotation, the photosensitive surface of the photosensitive drum 101 is moved in the minor scan direction, perpendicular to the major scan direction. Disposed above the photosensitive drum 101 is an electrical charging roller 102 which is mounted so that it surface contacts the photosensitive drum 101 surface so as to uniformly charge the drum surface. The surface of the photosensitive drum 101 having been charged by the charging roller 102 is irradiated with the scanning light beam 103, being scanningly deflected by the scanning optical device 100.

As has been described hereinbefore, the light beam 103 is modulated in accordance with the imagewise data Di, so hat, by projecting this light beam 103 onto the photosensitive drum 101 surface, an electrostatic latent image is produced there. This electrostatic latent image is subsequently developed as a toner image by a developing device 107, disposed to be engaged with the photosensitive drum 101 at a position downstream of the incidence position of the light beam 103 with respect to the rotational direction of the photosensitive drum 101.

The toner image developed by the developing device 107 is transferred to a paper sheet 112 (transfer material) by means of a transfer roller 108 which is disposed below the photosensitive drum 101 and mounted to be opposed to the photosensitive drum. Paper sheets 112 are accommodated in a paper cassette 109 in front of (at right-hand side in the drawing) the photosensitive drum 101. However, paper sheets can be supplied manually. Disposed at an end of the paper cassette 109 is a paper feed roller 110 which serves to feed individual paper sheets 112 inside the cassette 109, to a conveying path.

The paper sheet 112 having an unfixed toner image transferred thereto is conveyed to a fixing device behind (at left-hand side in the drawing) the photosensitive drum 101. The fixing device comprises a fixing roller 113 having an inside fixing heater (not shown) and a pressing roller 114 disposed to be in pressure contact with the fixing roller 113. A paper sheet 112 conveyed from the transfer station is heated while being pressed at the pressure engagement between the heating roller 113 and the pressing roller 114, by which the unfixed toner image on the sheet 112 is fixed. There are sheet discharging rollers 116 behind the fixing roller 113, and they function to discharge the fixed sheet 112 outwardly of the image forming apparatus.

Although not shown in the drawing, the printer controller 111 functions not only to convert the data as described above but also to perform various controls for various inside components of the image forming apparatus such as the motor 105 or a polygonal motor inside the scanning optical device, for example.

In this embodiment, as described above, a scanning optical element is constituted by a single lens having a toric surface and a deformed toric surface, and the minor scan magnification of the scanning optical element and that of each optical surface thereof are made substantially constant, within the image effective region. With this arrangement, the present embodiment accomplishes a scanning optical device in which, even if there occurs a deviation of the scanning optical element as a whole or a deviation of each optical surface thereof, due to a disposition error or production error, a curvature of scan line can be avoided. Further, when the scanning optical device is incorporated into an image forming apparatus, a high quality apparatus with small scan line curvature can be provided.

In accordance with the present invention as described hereinbefore, the main scan shape and the minor scan power arrangement of a scanning optical element of a scanning optical device are set appropriately, and this enables provision of a scanning optical device and a color image forming apparatus using the same in which the basic performance of a molded lens can be corrected satisfactorily and, additionally, a scan line curvature attributable to deviation of a light exit surface in Z direction (minor scan direction) with respect to a light entrance surface, due to insufficient precision of molding, can be minimized.

While the invention has been described with reference to the structures disclosed herein, it is not confined to the details set forth and this application is intended to cover such modifications or changes as may come within the purposes of the improvements or the scope of the following claims.

What is claimed is:

1. A scanning optical device, comprising:
    a light source;
    a deflecting element for scanningly deflecting a light beam emitted from said light source; and
    a scanning optical element for imaging the deflected light beam on a surface to be scanned;
    wherein said scanning optical element comprises a single lens made by use of a molding process;
    wherein a difference in imaging magnification of said scanning optical element in a minor scan direction, between axial and abaxial, is not greater than 10%; and
    wherein a shape of an optical surface of said single lens is determined, with respect to a predetermined one of two optical surfaces of said single lens which has a larger refractive power in the minor scan direction on the optical axis, so as to satisfy a relation $$0.90 \phi m/\phi p \leq \phi mx/\phi px \leq 1.1 \phi m/\phi p$$

where $\phi p$ is a refractive power of said single lens in the minor scan direction on the optical axis, $\phi m$ is a refractive power of said single lens in the minor scan direction at a most abaxial point, $\phi px$ is a refractive power at said predetermined optical surface of said single lens in the minor scan direction on the optical axis, and $\phi mx$ is a refractive power at said predetermined optical surface of said single lens in the minor scan direction at a most abaxial point.

2. A scanning optical device according to claim 1, wherein said predetermined optical surface of said single lens is a light exit surface.

3. A scanning optical device according to claim 1, wherein the power at the light exit surface of said single lens in the minor scan direction satisfies a relation $0.9 \leq \phi s2/\phi s \leq 1.1$ where $\phi s$ is the power of said scanning optical element as a whole, in the minor scan direction, and $\phi s2$ is the power at the light exit surface of said single lens.

4. A scanning optical device according to claim 3, wherein the power at the light exit surface of said single lens in the minor scan direction satisfies a relation $0.95 \leq \phi s2/\phi s \leq 1.05$.

5. A scanning optical device according to claim 1, wherein the shape of the light exit surface of said single lens in the major scan direction satisfies a relation $$0.9 \times (L_{b0}/L_{a0}) \leq (L_{b\theta}/L_{a\theta}) \leq 1.1 \times (L_{b0}/L_{a0})$$

where $L_{a0}$ is the distance, converted with air, on the optical axis from said deflecting element to the light exit surface of said single lens, $L_{b0}$ is the distance from the light exit surface of said single lens to the surface to be scanned, $L_{a\theta}$ is the distance, converted with air, from said deflecting element as abaxial to the light exit surface of said single lens, and $L_{b\theta}$ is the abaxial distance from the light exit surface of said single lens to the surface to be scanned.

6. A scanning optical device according to claim 5, wherein the shape of the light exit surface of said single lens in the main scan direction satisfies a relation $$0.95 \times (L_{b0}/L_{a0}) \leq (L_{b\theta}/L_{a\theta}) \leq 1.05 \times (L_{b0}/L_{a0}).$$

7. A scanning optical device according to claim 1, wherein light in the form of a linear image being elongated in the major scan direction is incident on said deflecting element.

8. A scanning optical device according to claim 1, wherein the power of the light exit surface in the minor scan direction changes without correlation with the shape in the major scan direction.

9. A scanning optical device according to claim 1, wherein a curvature radius of the light exit surface in the minor scan direction changes from the axial to the abaxial.

10. A scanning optical device according to claim 1, wherein the light exit surface and the light entrance surface are an anamorphic surface.

11. A scanning optical device according to claim 1, wherein the light exit surface of said single lens has an arcuate shape.

12. A scanning optical device according to claim 11, wherein the light exit surface of said single lens in the major scan direction has an arcuate shape being concaved towards said deflecting element.

13. A scanning optical device according to claim 1, wherein the light exit surface of said single lens has a shape other than an arcuate shape.

14. A scanning optical device according to claim 1, wherein said light source comprises a multiple beam light source having a plurality of light emission points adapted to be modulated independently of each other.

15. An image forming apparatus, comprising:
a scanning optical device as recited in claim 1;
a photosensitive member disposed at a surface to be scanned;
a developing device for developing, into a toner image, an electrostatic latent image formed on said photosensitive member with light scanned by said scanning optical system;
a transferring device for transferring the developed toner image to a transfer material; and
a fixing device for fixing the transferred toner image on the transfer material.

16. An image forming apparatus, comprising:
a scanning optical device as recited in claim 1; and
a printer controller for converting code data inputted from an outside equipment into an imagewise information and for applying it into said scanning optical device.

17. A color image forming apparatus, comprising:
a plurality of scanning optical devices each being as recited in claim 1; and
a plurality of image bearing members each being disposed at a surface to be scanned by a corresponding one of said plurality of scanning optical devices, for forming images of different colors.

18. A scanning optical device according to claim 1, wherein the power of the light entrance surface in the minor scan direction changes without correlation with the shape in the major scan direction.

19. A scanning optical device according to claim 1, wherein the power of the light exit surface in the minor scan direction and the power of the light entrance surface in the minor scan direction changes without correlation with the shape in the major scan direction.

20. A scanning optical device, comprising:
a light source;
a deflecting element for scanningly deflecting a light beam emitted from said light source; and
a scanning optical element for imaging, into a spot-like shape, the deflected light beam on a surface to be scanned;
wherein said scanning optical element comprises a single lens made by use of a molding process;
wherein a shape of an optical surface of said single lens is determined so that a difference in imaging magnification of said scanning optical element in a minor scan direction and within an image effective region is not greater than 10%, and that a difference in imaging magnification, in the minor scan direction and within an image effective region, of a predetermined one of two optical surfaces of said single lens which has a larger refractive power in the minor scan direction on the optical axis, is not greater than 10%,
wherein the power of said scanning optical element as a whole in the minor scan direction is $\phi s$, and the power, in the minor scan direction, of that surface of the single lens which has a larger refracting power in the minor scan direction is $\phi sx$, the power in the minor scan direction of that surface of the single lens which has a larger refracting power in the minor scan direction satisfies a relation $0.9 \leq \phi sx/\phi s \leq 1.1$.

21. A scanning optical device according to claim 20, wherein said predetermined optical surface of said single lens is a light exit surface.

22. A scanning optical device according to claim 21, wherein the power at the light exit surface of said single lens in the minor scan direction satisfies a relation $$0.95 \leq \phi s2/\phi s \leq 1.05.$$

23. A scanning optical device according to claim 21, wherein a curvature radius of the light exit surface in the minor scan direction changes from the axial to the abaxial.

24. A scanning optical device according to claim 20, wherein the shape of the light exit surface of said single lens in the major scan direction satisfies a relation $$0.9 \times (L_{b0}/L_{a0}) \leq (L_{b\theta}/L_{a\theta}) \leq 1.1 \times (L_{b0}/L_{a0})$$

where $L_{a0}$ is the distance, converted with air, on the optical axis from said deflecting element to the light exit surface of said single lens, $L_{b0}$ is the distance from the light exit surface of said single lens to the surface to be scanned, $L_{a\theta}$ is the distance, converted with air, from said deflecting element as abaxial to the light exit surface of said single lens, and $L_{b\theta}$ is abaxial the distance from the light exit surface of said single lens to the surface to be scanned.

25. A scanning optical device according to claim 24, wherein the shape of the light exit surface of said single lens in the main scan direction satisfies a relation $$0.95 \times (L_{b0}/L_{a0}) \leq (L_{b\theta}/L_{a\theta}) \leq 1.05 \times (L_{b0}/L_{a0}).$$

26. A scanning optical device according to claim 20, wherein light in the form of a linear image being elongated in the major scan direction is incident on said deflecting element.

27. A scanning optical device according to claim 20, wherein the power of the light exit surface in the minor scan direction changes without correlation with the shape in the major scan direction.

28. A scanning optical device according to claim 20 wherein the light exit surface and the light entrance surface are an anamorphic surface.

29. A scanning optical device according to claim 20, wherein the light exit surface of said single lens has an arcuate shape.

30. A scanning optical device according to claim 29, wherein the light exit surface of said single lens in the major scan direction has an arcuate shape being concaved towards said deflecting element.

31. A scanning optical device according to claim 20, wherein the light exit surface of said single lens has a shape other than an arcuate shape.

32. A scanning optical device according to claim 20, wherein said light source comprises a multiple beam light source having a plurality of light emission points adapted to be modulated independently of each other.

33. An image forming apparatus, comprising:

a scanning optical device as recited in claim 20;

a photosensitive member disposed at a surface to be scanned;

a developing device for developing, into a toner image, an electrostatic latent image formed on said photosensitive member with light scanned by said scanning optical system;

a transferring device for transferring the developed toner image to a transfer material; and a fixing device for fixing the transferred toner image on the transfer material.

34. An image forming apparatus, comprising:

a scanning optical device as recited in claim 20; and a printer controller for converting code data inputted from an outside equipment into an imagewise information and for applying it into said scanning optical device.

35. A color image forming apparatus, comprising:

a plurality of scanning optical devices each being as recited in claim 20; and a plurality of image bearing members each being disposed at a surface to be scanned by a corresponding one of said plurality of scanning optical devices, for forming images of different colors.

36. A scanning optical device according to claim 20, wherein the power of the light entrance surface in the minor scan direction changes without correlation with the shape in the major scan direction.

37. A scanning optical device according to claim 20, wherein the power of the light exit surface in the minor scan direction and the power of the light entrance surface in the minor scan direction changes without correlation with the shape in the major scan direction.

* * * * *

UNITED STATES PATENT AND TRADEMARK OFFICE
CERTIFICATE OF CORRECTION

PATENT NO. : 6,774,924 B2
DATED : August 10, 2004
INVENTOR(S) : Manabu Kato et al.

It is certified that error appears in the above-identified patent and that said Letters Patent is hereby corrected as shown below:

Column 6,
Lines 57-58, "$0.9\phi m/\phi p \leq \phi mx/\phi px \leq 1.1 m/\phi p$" should read -- $0.9\phi m/\phi p \leq \phi mx/\phi px \leq 1.1\phi m/\phi p$ --.

Column 8,
Lines 54-56, "$(L_{bd}/L_{a\theta}) = 1.0057 \times (L_{b0d}/L_{a0})$" should read -- $(L_{bd}/L_{a\theta}) = 1.0057 \times (L_{bd}/L_{a0})$ --.

Column 11,
Lines 22-24, "$0.9 \leq \theta s2/\theta s = 0.932 \leq 1.1$" should read -- $0.9 \leq \phi s2/\phi s = 0.932 \leq 1.1$ --.

Signed and Sealed this

Twenty-sixth Day of April, 2005

JON W. DUDAS
*Director of the United States Patent and Trademark Office*